(12) United States Patent
Yang

(10) Patent No.: US 8,529,393 B2
(45) Date of Patent: *Sep. 10, 2013

(54) LOCKABLE OR RELEASABLE WHEEL SYSTEM WITH BIDIRECTIONAL INPUT AND ONE-WAY OUTPUT

(76) Inventor: Tai-Her Yang, Dzan-Hwa (TW)

(*) Notice: Subject to any disclaimer, the term of this patent is extended or adjusted under 35 U.S.C. 154(b) by 413 days.

This patent is subject to a terminal disclaimer.

(21) Appl. No.: 12/656,161

(22) Filed: Jan. 20, 2010

(65) Prior Publication Data

US 2011/0177907 A1 Jul. 21, 2011

(51) Int. Cl.
*F16H 48/20* (2012.01)

(52) U.S. Cl.
USPC ............................ 475/230; 475/220; 74/322

(58) Field of Classification Search
USPC ............................ 475/230; 74/322
See application file for complete search history.

(56) References Cited

U.S. PATENT DOCUMENTS

| | | | | |
|---|---|---|---|---|
| 1,490,796 A * | 4/1924 | Blomberg | ...................... | 74/810.1 |
| 3,094,195 A * | 6/1963 | Lund | ............................ | 188/82.2 |
| 3,939,719 A * | 2/1976 | Stovall | ............................. | 74/128 |
| 4,341,292 A * | 7/1982 | Acevedo | ......................... | 192/43 |
| 4,353,263 A * | 10/1982 | Ciciora | ............................. | 74/337 |
| 5,435,583 A * | 7/1995 | Foster, Jr. | ...................... | 280/237 |
| 5,884,927 A * | 3/1999 | Mahaney et al. | ............. | 280/237 |
| 5,957,802 A * | 9/1999 | Yoo | ................................. | 475/294 |
| 6,723,029 B2 * | 4/2004 | Salgado | ......................... | 482/57 |
| 8,272,988 B2 * | 9/2012 | Yang | ............................. | 475/12 |
| 8,353,228 B2 * | 1/2013 | Yang | ............................. | 475/12 |
| 2011/0190086 A1 * | 8/2011 | Yang | ............................. | 475/12 |
| 2011/0190087 A1 * | 8/2011 | Yang | ............................. | 475/12 |
| 2011/0201468 A1 * | 8/2011 | Yang | ............................. | 475/12 |
| 2011/0201469 A1 * | 8/2011 | Yang | ............................. | 475/12 |

* cited by examiner

*Primary Examiner* — David D Le
*Assistant Examiner* — Colby M Hansen
(74) *Attorney, Agent, or Firm* — Bacon & Thomas, PLLC

(57) ABSTRACT

The lockable or releasable gear train with bidirectional input and one-way output relates to a transmission structure, wherein the rotary direction of the input shaft of the gear train with bidirectional input and one-way output is changed to make the direction of the output of the output shaft to be constant, which is characterized by releasing the lockable or releasable mechanism, the output shaft is moved reversely when reversely driven.

53 Claims, 21 Drawing Sheets

LOCKABLE OR RELEASABLE WHEEL SYSTEM WITH BIDIRECTIONAL INPUT AND ONE-WAY OUTPUT

BACKGROUND OF THE INVENTION (a) Field of the Invention

The lockable or releasable gear train with bidirectional input and one-way output relates to a transmission structure, wherein the drive rotary direction of the input shaft of the gear train with bidirectional input and one-way output is changed to make the direction of the output of the output shaft be constant, which is characterized by releasing the lockable or releasable mechanism, the output shaft is moved reversely when reversely driven.

(b) Description of the Prior Art

The limitation of the conventional gear train with dual rotary direction input and constant rotary direction output is to be locked when the output side is reversely driven.

SUMMARY OF THE INVENTION

For the lockable or releasable gear train with bidirectional input and one-way output, the lockable or releasable mechanism is installed between the machine body and the rotatable shell of the gear train with bidirectional input and one-way output, and/or the fixed shell and the rotating parts of the gear train with bidirectional input and one-way output, wherein the gear train is released through the operation of the lockable or releasable mechanism, when the input shaft is driven at reverse rotary direction by the output shaft, idling is produced between the rotatable shell of the gear train with bidirectional input and one-way output and the machine body, or idling is produced between the rotating parts of the gear train with bidirectional input and one-way output and the fixed shell, to prevent the gear train from the structural shortcoming of rigid lock status when the input side is driven at reverse rotary direction by the output side of the gear train with bidirectional input and one-way output.

DESCRIPTION OF MAIN COMPONENT SYMBOLS

Figure 1:
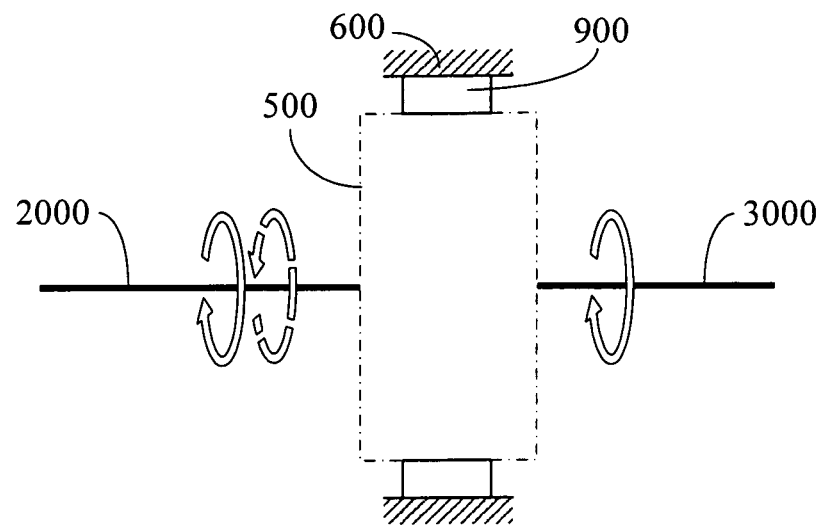
FIG. 1 is a structural schematic view showing the input shaft and the output shaft coaxially installed in series, according to the present invention.

102: Sun wheel
103: Planetary wheel
104: Outer wheel
200: Planetary wheel support arm ring frame
201: Planetary wheel shaft
301, 302, 303, 305: one-way transmission
400: Epicyclic gear support arm ring frame
401: Epicyclic gear shaft
402: Inward oblique wheel
403: Epicyclic gear
404: Outward oblique wheel
500: Shell of gear train
600: Machine body
602, 603, 605, 606, 615, 616, 617: driving wheel
604: Revolving shaft
607: Driving belt
618: Revolving shaft
900: Lockable or releasable mechanism
2000: Input shaft
3000: Output shaft

DETAILED DESCRIPTION OF THE PREFERRED EMBODIMENTS

The limitation of the conventional gear train with dual rotary direction input and constant rotary direction output is to be locked when the output side is reversely driven.

For the lockable or releasable gear train with bidirectional input and one-way output, the lockable or releasable mechanism is installed between the machine body and the rotatable shell of the gear train with bidirectional input and one-way output, and/or the fixed shell and the rotating parts of the gear train with bidirectional input and one-way output, wherein the gear train is released through the operation of the lockable or releasable mechanism, when the input shaft is driven at reverse rotary direction by the output shaft, idling is produced between the rotatable shell of the gear train with bidirectional input and one-way output and the machine body, or idling is produced between the rotating parts of the gear train with bidirectional input and one-way output and the fixed shell, to prevent the gear train from the structural shortcoming of rigid lock status when the input side is driven at reverse rotary direction by output side of the gear train with bidirectional input and one-way output.

For the lockable or releasable gear train with bidirectional input and one-way output, the structural types include the input shaft and the output shaft coaxially installed in series, or the both coaxial fitting.

FIG. 1 is a structural schematic view showing the input shaft and the output shaft coaxially installed in series, according to the present invention.

Figure 2:
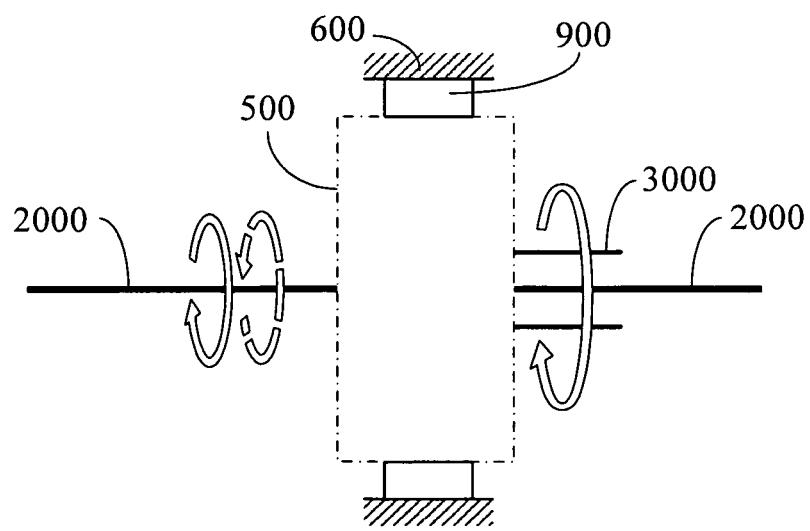
FIG. 2 is a structural schematic view showing the input shaft and the output shaft coaxial fitting, according to the present invention.

FIG. 2 is a structural schematic view showing the input shaft and the output shaft coaxial fitting, according to the present invention.

The operational features of the lockable or releasable gear train with bidirectional input and one-way output are as following:

the first rotary direction and the second rotary direction are reverse;

if the input terminal is driven by the first rotary direction, the first rotary direction output is produced through the first driving gear train driving the output terminal;

if the input terminal is driven by the second rotary direction, the first rotary direction output is produced through the second driving gear train driving the output terminal;

an one-way transmission is installed between the first driving gear train and the second driving gear train to avoid the interference from the second driving gear train when the first driving gear train is used to be the first rotary direction input and produces the first rotary direction output;

an one-way transmission is installed between the second driving gear train and the first driving gear train to avoid the interference from the first driving gear train when the second driving gear train is used to be the second rotary direction input and produces the first rotary direction output; and by way of the lockable or releasable mechanism being installed between the rotatable shell of the driving gear train and the machine body, or the lockable or releasable mechanism being installed between the fixed shell and the rotating parts of the gear train with bidirectional input and one-way output, to prevent the gear train from the structural deficiency of rigid lock status when the input side is driven at reverse rotary direction by output side of the gear train with bidirectional input and one-way output.

The above forward and reverse rotary power source derives from one or more of the following power source, including human power, machine power, electric motors, hydraulic motors or pneumatic motors; including:

(1) the forward and reversely driven by human power; or
(2) the forward and reversely driven by machine power; or
(3) the forward and reversely driven by hydraulic or pneumatic motors; or
(4) the forward and reversely driven by electric motors; or
(5) driven at different directions by the rotary power sources from (1) to (4); and the gear train with bidirectional input and one-way output constituted by the planetary gear train or the epicyclic gear train, which have the same functions, or by integrating with the transmission with different drive rotary direction;

lockable or releasable mechanism 900: related to a mechanism driven to be locked or released by human power, or machine power, or aerodynamic force, or fluid power, or electromagnetic force.

Some embodiments are provided as following to describe the enforceability of the lockable or releasable gear train with bidirectional input and one-way output, and the other embodiments with same functions are omitted.

The following are a variety of structural types of the lockable or releasable gear train with bidirectional input and one-way output, including:

A) as shown in FIGS. 3 to 19, which is constituted by the planetary gear train;

B) as shown in FIGS. 20 to 36, which is constituted by the epicyclic gear train; and C) as shown in FIGS. 37 to 42, which is constituted by integrating with the transmission with different drive rotary direction.

Figure 3:
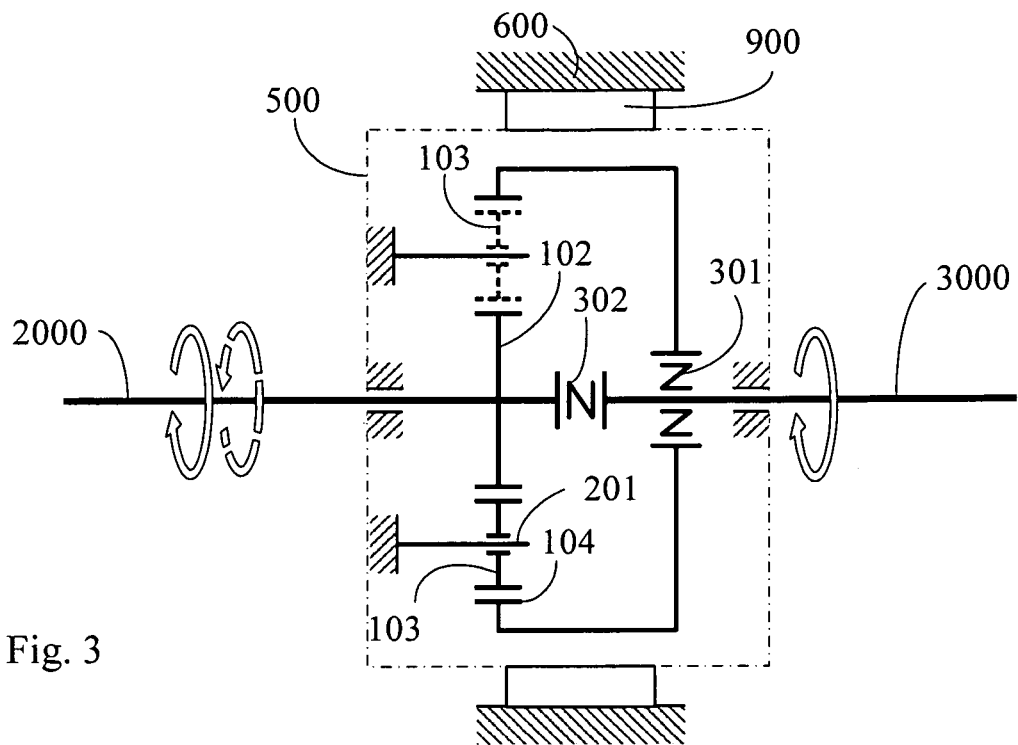
FIG. 3 is a structural schematic view showing the 1st embodiment of the lockable or releasable gear train with bidirectional input and one-way output constituted by the planetary gear train, according to the present invention.

The structural descriptions are as following:

For A: as shown in FIGS. 3 to 19, the lockable or releasable gear train with bidirectional input and one-way output is constituted by the planetary gear train, including:

FIG. 3 is a structural schematic view showing the 1st embodiment of the lockable or releasable gear train with bidirectional input and one-way output constituted by the planetary gear train, according to the present invention.

As shown in FIG. 3, the lockable or releasable gear train with bidirectional input and one-way output is constituted by the planetary gear train with the input shaft and the output shaft coaxially installed in series, the main components including:

one end of an input shaft 2000 through installed at one side of a shell of the gear train 500 via bearing structure, another end of the input shaft 2000 and an output shaft 3000 coaxially installed in series via an one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with sun wheel 102;

a planetary wheel 103 installed between the outer wheel 104 and the sun wheel 102; the center of the planetary wheel 103 rotating at a planetary wheel shaft 201, and one end of the planetary wheel shaft 201 fixed at the shell of the gear train 500;

the lockable or releasable mechanism 900 installed between the shell of the gear train 500 and the machine body 600;

an one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 4:
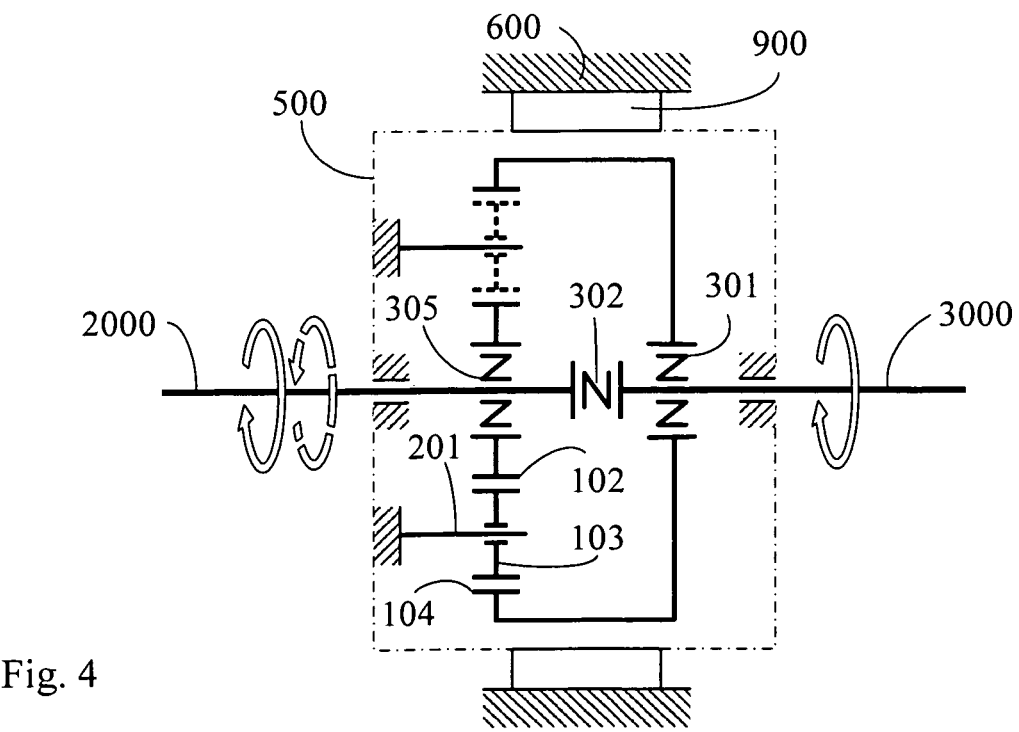
FIG. 4 is a structural schematic view showing the 2nd embodiment of the lockable or releasable gear train with bidirectional input and one-way output constituted by the planetary gear train, according to the present invention.

FIG. 4 is a structural schematic view showing the 2nd embodiment of the lockable or releasable gear train with bidirectional input and one-way output constituted by the planetary gear train, according to the present invention.

As shown in FIG. 4, the lockable or releasable gear train with bidirectional input and one-way output is constituted by the planetary gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 through sun wheel 102, and one-way transmission 305 installed between the above both;
- the planetary wheel 103 installed between the outer wheel 104 and the sun wheel 102; the center of the planetary wheel 103 rotating at the planetary wheel shaft 201, and one end of the planetary wheel shaft 201 fixed at the shell of the gear train 500;
- the lockable or releasable mechanism 900 installed between the shell of the gear train 500 and the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the one-way transmission 305 for driving the sun wheel 102 and for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 5:
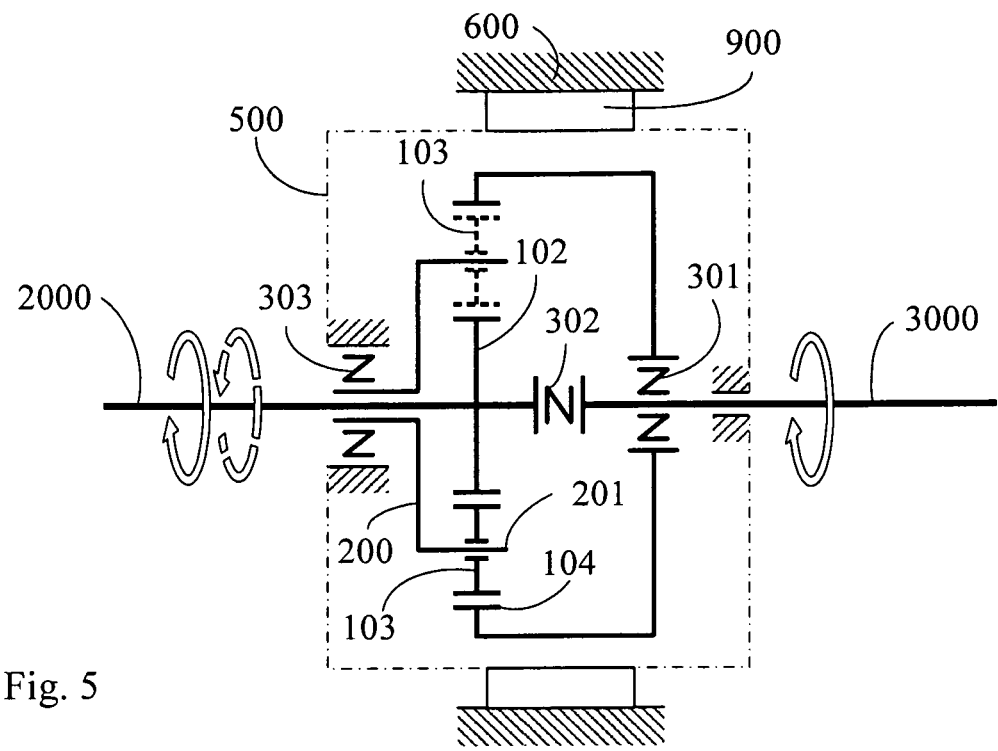
FIG. 5 is a structural schematic view showing the 3rd embodiment of the lockable or releasable gear train with bidirectional input and one-way output constituted by the planetary gear train, according to the present invention.

FIG. 5 is a structural schematic view showing the 3$^{rd}$ embodiment of the lockable or releasable gear train with bidirectional input and one-way output constituted by the planetary gear train, according to the present invention.

As shown in FIG. 5, the lockable or releasable gear train with bidirectional input and one-way output is constituted by the planetary gear train with the input shaft and the output shaft coaxially installed in series, the main components including:

- one end of the input shaft 2000 through installed at one side of the shell of the gear train 500 via rotational structure of planetary wheel support arm ring frame 200 and one-way transmission 303, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with sun wheel 102;
- the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating between the input shaft 2000 and the one-way transmission 303;
- the lockable or releasable mechanism 900 installed between the shell of the gear train 500 and the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 6:
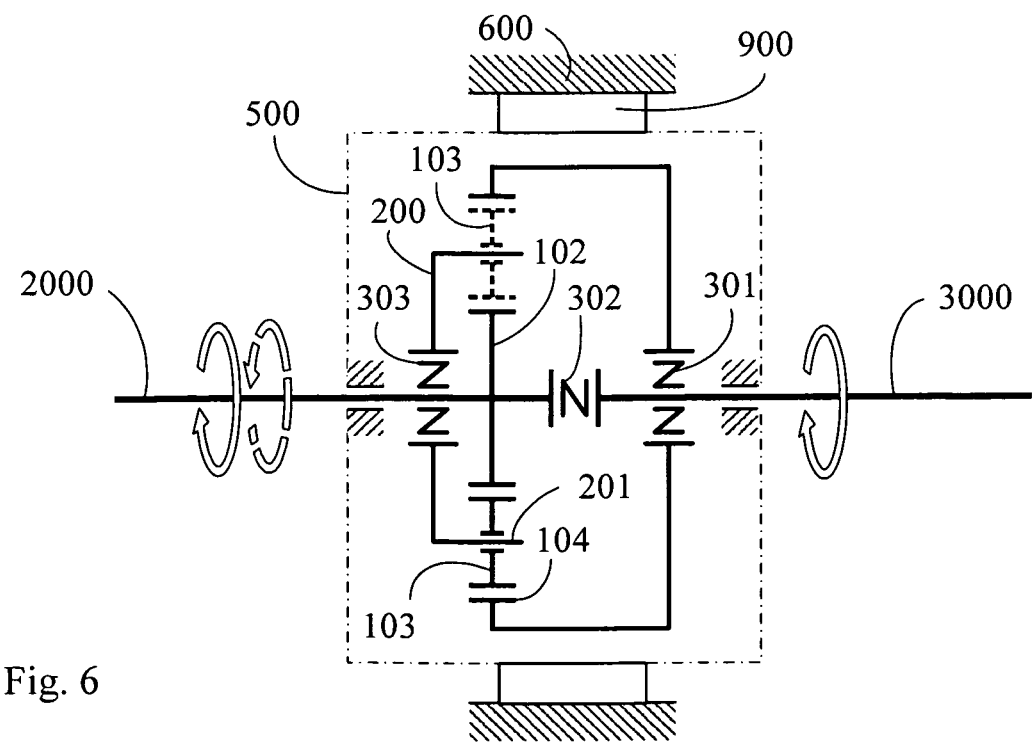
FIG. 6 is a structural schematic view showing the 4th embodiment of the lockable or releasable gear train with bidirectional input and one-way output constituted by the planetary gear train, according to the present invention.

FIG. 6 is a structural schematic view showing the 4th embodiment of the lockable or releasable gear train with bidirectional input and one-way output constituted by the planetary gear train, according to the present invention.

As shown in FIG. 6, the lockable or releasable gear train with bidirectional input and one-way output is constituted by the planetary gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the input shaft 2000 between the shell of the gear train 500 and the sun wheel 102 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, for driving the sun wheel 102 and for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 7:
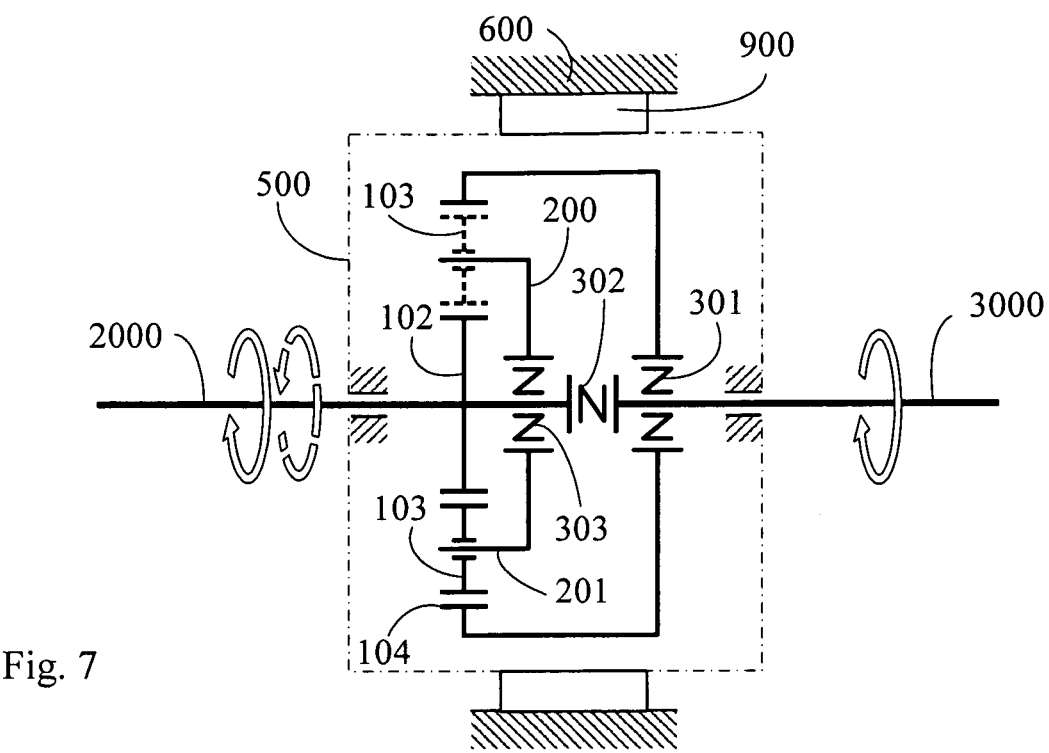
FIG. 7 is a structural schematic view showing the 5th embodiment of the lockable or releasable gear train with bidirectional input and one-way output constituted by the planetary gear train, according to the present invention.

FIG. 7 is a structural schematic view showing the 5th embodiment of the lockable or releasable gear train with bidirectional input and one-way output constituted by the planetary gear train, according to the present invention.

As shown in FIG. 7, the lockable or releasable gear train with bidirectional input and one-way output is constituted by the planetary gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with sun wheel 102;

the planetary wheel 103 installed between the outer wheel 104 and the sun wheel 102; the center of the planetary wheel 103 rotating at the planetary wheel shaft 201, the planetary wheel shaft 201 integrated with the planetary wheel support arm ring frame 200, and the planetary wheel support arm ring frame 200 rotating at the input shaft 2000 between the one-way transmission 302 and the sun wheel 102 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 8:
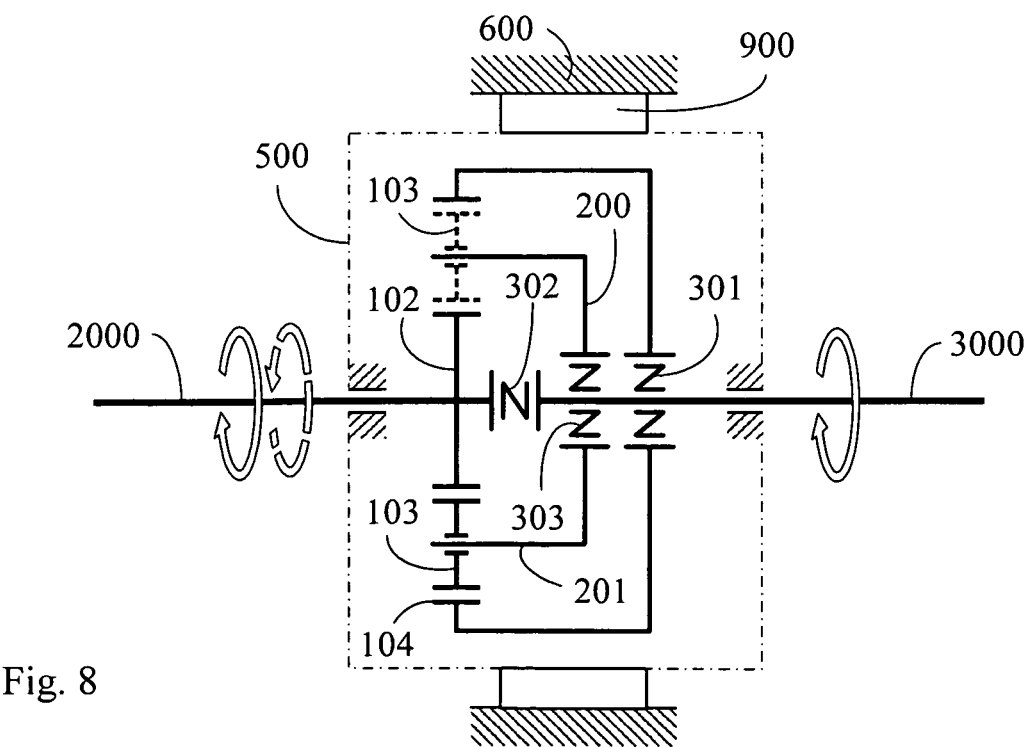
FIG. 8 is a structural schematic view showing the 6th embodiment of the lockable or releasable gear train with bidirectional input and one-way output constituted by the planetary gear train, according to the present invention.

FIG. 8 is a structural schematic view showing the 6th embodiment of the lockable or releasable gear train with bidirectional input and one-way output constituted by the planetary gear train, according to the present invention.

As shown in FIG. 8, the lockable or releasable gear train with bidirectional input and one-way output is constituted by the planetary gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with sun wheel 102;
- the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the input shaft 2000 between the one-way transmission 301 and the one-way transmission 302 via the one-way transmission 303;
- the lockable or releasable mechanism (900) installed between the sell of transmission gear train 500 and the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, for driving the sun wheel 102 and for further driving the planetary wheel 103 and the outer wheel 104, and through the ring structure of the outer wheel 104 and the one-way transmission 301, for driving the output shaft 3000 to produce the first rotary direction output to constitute the second driving gear train; and
- when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 9:
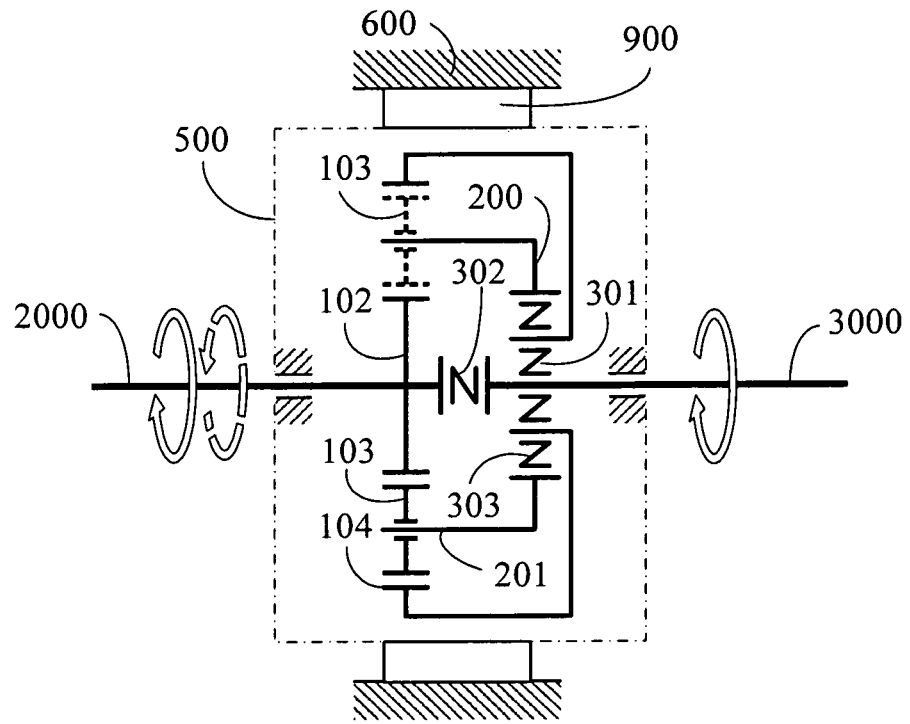
FIG. 9 is a structural schematic view showing the 7th embodiment of the lockable or releasable gear train with bidirectional input and one-way output constituted by the planetary gear train, according to the present invention.

FIG. 9 is a structural schematic view showing the 7th embodiment of the lockable or releasable gear train with bidirectional input and one-way output constituted by the planetary gear train, according to the present invention.

As shown in FIG. 9, the lockable or releasable gear train with bidirectional input and one-way output is constituted by the planetary gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with sun wheel 102;
- the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, the planetary wheel support arm ring frame 200 rotating at the ring structure of the outer wheel 104 surrounded the one-way transmission 301 via the one-way transmission 303, and the one-way transmission 301 rotating at the output shaft 3000;
- the lockable or releasable mechanism 900 installed between the shell of the gear train 500 and the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the sun wheel 102 for driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 10:
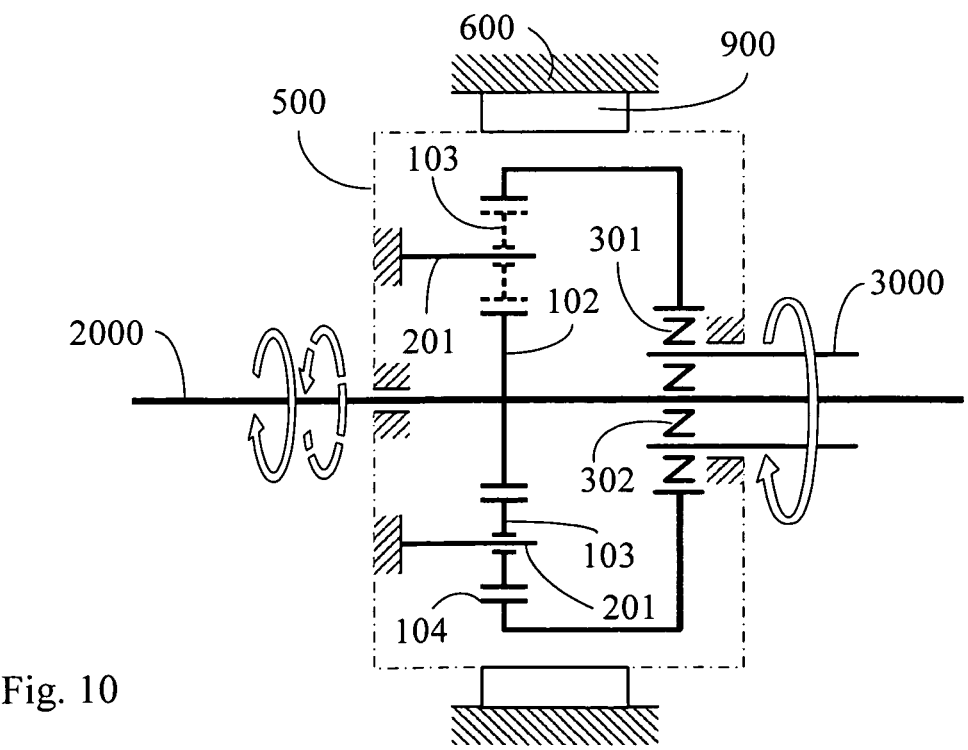
FIG. 10 is a structural schematic view showing the 8th embodiment of the lockable or releasable gear train with bidirectional input and one-way output constituted by the planetary gear train, according to the present invention.

FIG. 10 is a structural schematic view showing the 8th embodiment of the lockable or releasable gear train with bidirectional input and one-way output constituted by the planetary gear train, according to the present invention.

As shown in FIG. 10, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with sun wheel 102;

the planetary wheel 103 installed between the outer wheel 104 and the sun wheel 102; the center of the planetary wheel 103 rotating at the planetary wheel shaft 201, one end of the planetary wheel shaft 201 fixed at the shell of the gear train 500;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 11:
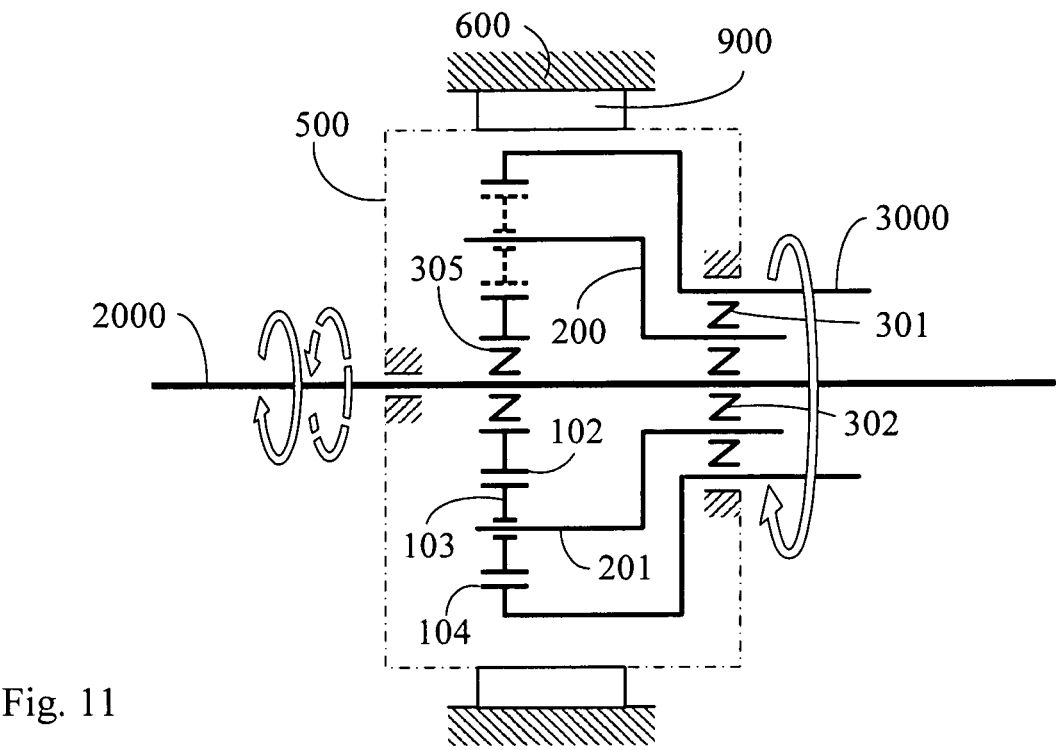
FIG. 11 is a structural schematic view showing the 9th embodiment of the lockable or releasable gear train with bidirectional input and one-way output constituted by the planetary gear train, according to the present invention.

FIG. 11 is a structural schematic view showing the 9th embodiment of the lockable or releasable gear train with bidirectional input and one-way output constituted by the planetary gear train, according to the present invention.

As shown in FIG. 11, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, the planetary wheel support arm ring frame 200, and the one-way transmission 301, which are coaxial fitting, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 through the sun wheel 102, and the one-way transmission 305 installed between the above both;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating between the one-way transmission 301 and the one-way transmission 302;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the coaxial fitting one-way transmission 302, the planetary wheel support arm ring frame 200 and the one-way transmission 301 driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 and the sun wheel 102 for further driving the planetary wheel 103 and the outer wheel 104, and through the ring structure of the outer wheel 104, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 12:
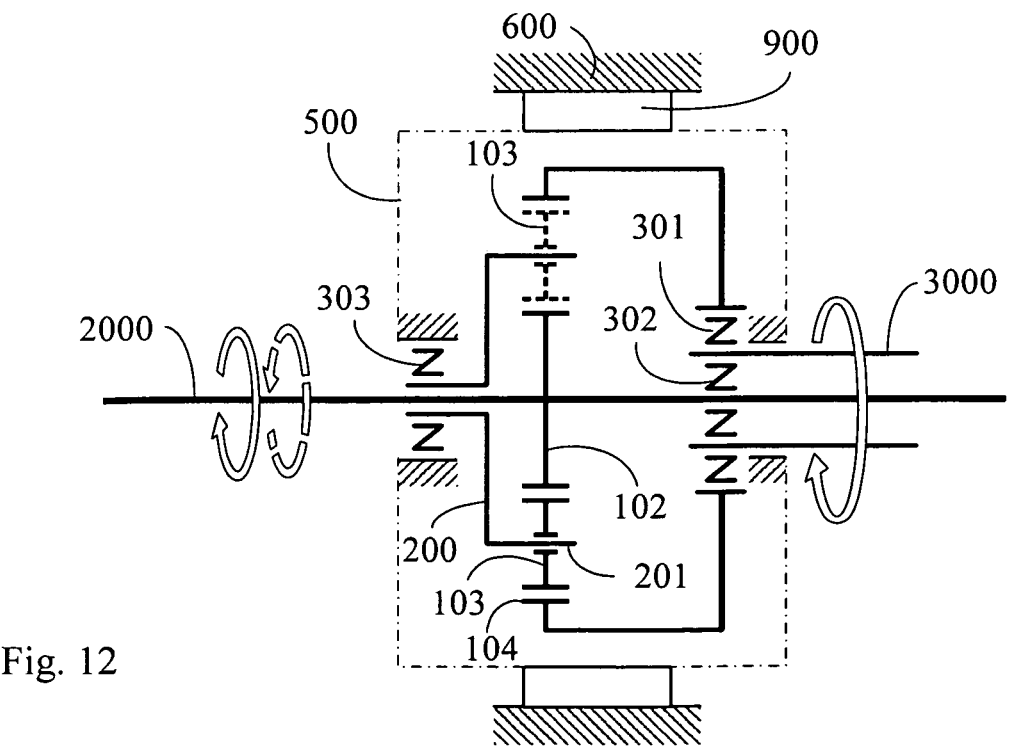
FIG. 12 is a structural schematic view showing the 10th embodiment of the lockable or releasable gear train with bidirectional input and one-way output constituted by the planetary gear train, according to the present invention.

FIG. 12 is a structural schematic view showing the 10th embodiment of the lockable or releasable gear train with bidirectional input and one-way output constituted by the planetary gear train, according to the present invention.

As shown in FIG. 12, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500 via rotational structure of the planetary wheel support arm ring frame 200 and the one-way transmission 303, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating between the input shaft 2000 and the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the coaxial fitting one-way transmission 302, for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 13:
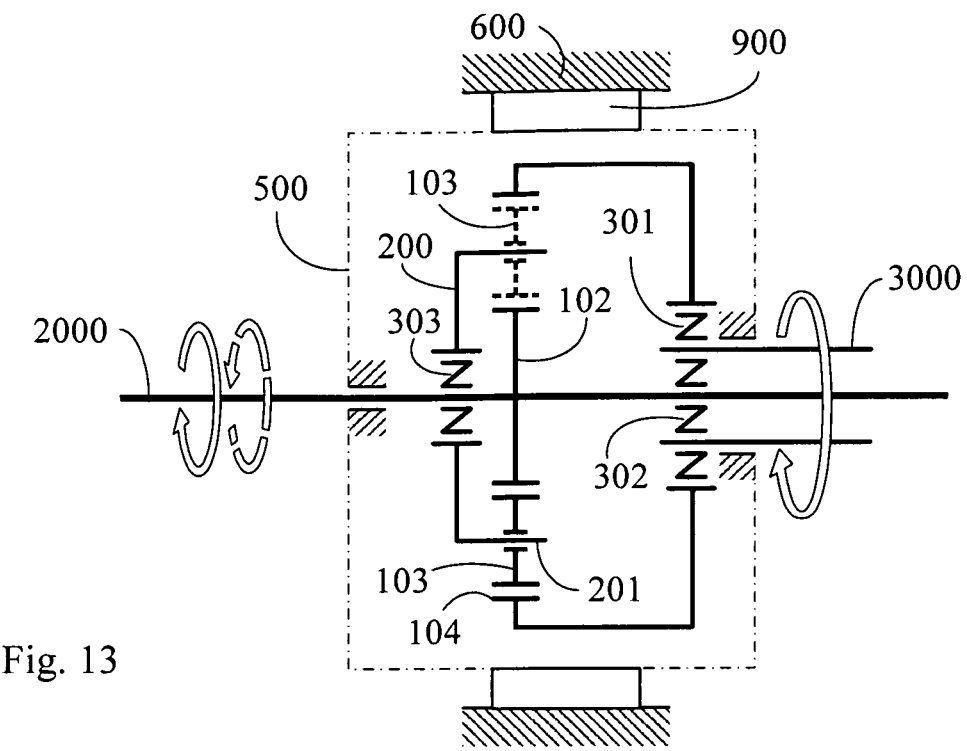
FIG. 13 is a structural schematic view showing the 11th embodiment of the lockable or releasable gear train with bidirectional input and one-way output constituted by the planetary gear train, according to the present invention.

FIG. 13 is a structural schematic view showing the 11th embodiment of the lockable or releasable gear train with bidirectional input and one-way output constituted by the planetary gear train, according to the present invention.

As shown in FIG. 13, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the input shaft 2000 between the sun wheel 102 and the shell of the gear train 500 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302, for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 14:
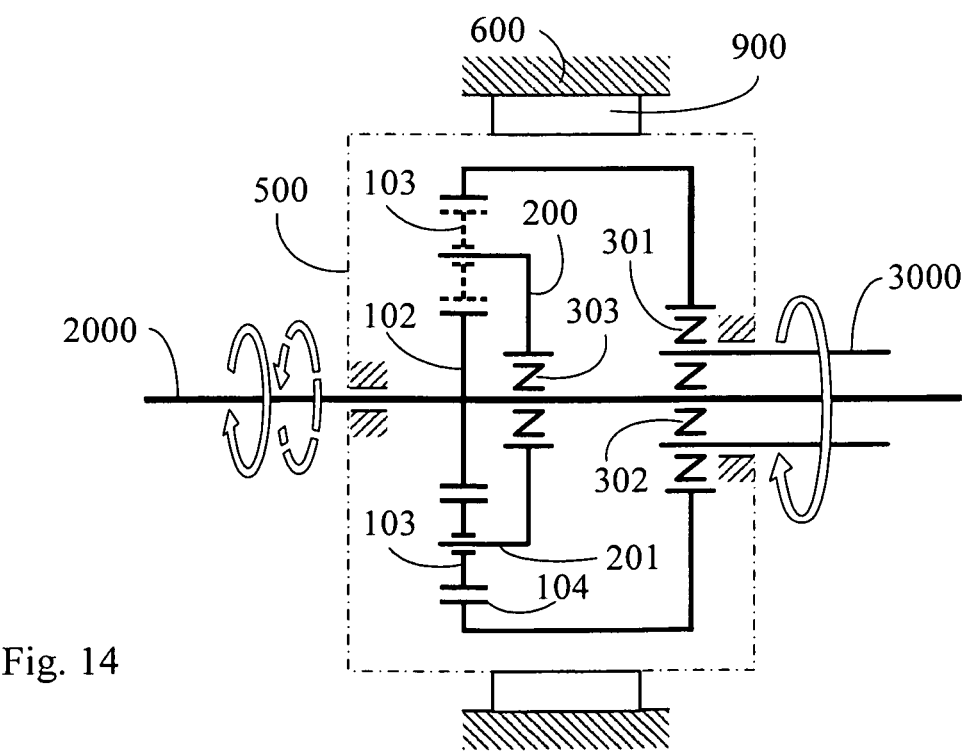
FIG. 14 is a structural schematic view showing the 12th embodiment of the lockable or releasable gear train with bidirectional input and one-way output constituted by the planetary gear train, according to the present invention.

FIG. 14 is a structural schematic view showing the 12th embodiment of the lockable or releasable gear train with bidirectional input and one-way output constituted by the planetary gear train, according to the present invention.

As shown in FIG. 14, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the input shaft 2000 between the sun wheel 102 and the one-way transmission 302 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302, for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 15:
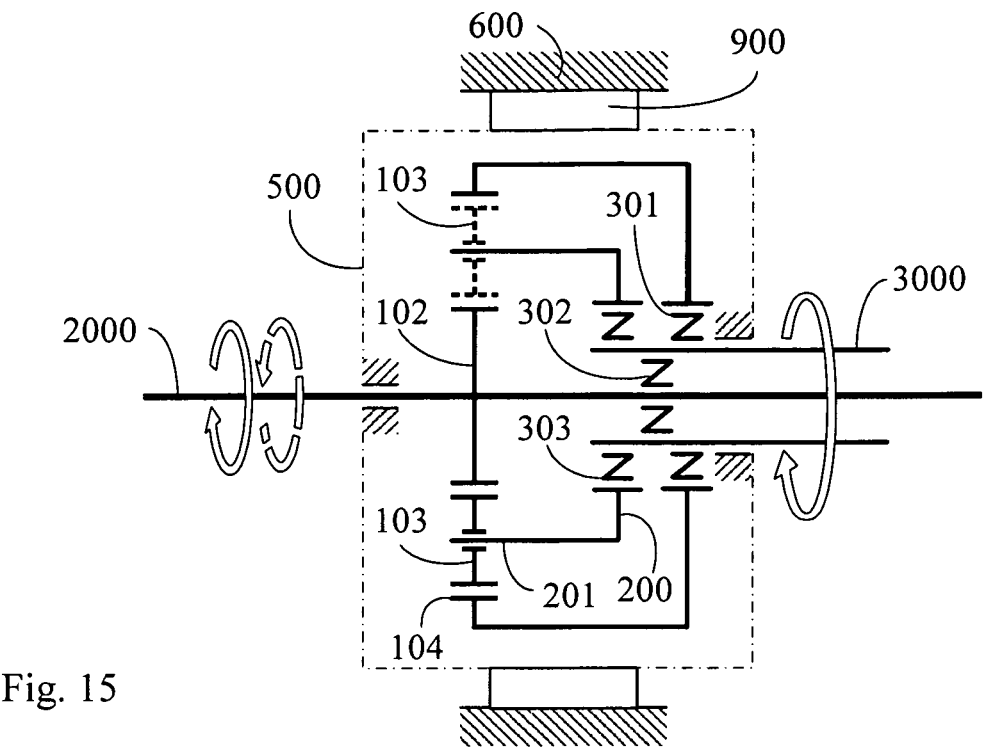
FIG. 15 is a structural schematic view showing the 13th embodiment of the lockable or releasable gear train with bidirectional input and one-way output constituted by the planetary gear train, according to the present invention.

FIG. 15 is a structural schematic view showing the 13th embodiment of the lockable or releasable gear train with bidirectional input and one-way output constituted by the planetary gear train, according to the present invention.

As shown in FIG. 15, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the output shaft 3000 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302, for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 16:
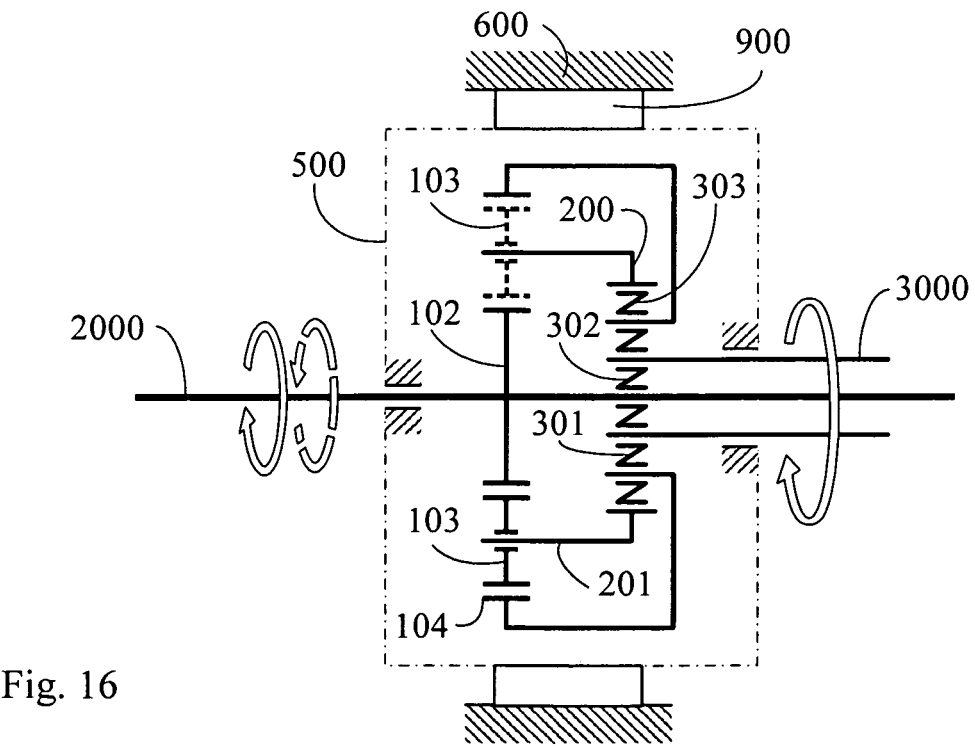
FIG. 16 is a structural schematic view showing the 14th embodiment of the lockable or releasable gear train with bidirectional input and one-way output constituted by the planetary gear train, according to the present invention.

FIG. 16 is a structural schematic view showing the 14th embodiment of the lockable or releasable gear train with bidirectional input and one-way output constituted by the planetary gear train, according to the present invention.

As shown in FIG. 16, the lockable or releasable gear train with bidirectional input and one-way output is constituted by the planetary gear train with the input shaft and the output shaft coaxial fitting, the main components including:

one end of the input shaft 2000 through installed at one side of the shell of the gear train 500, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, and the planetary wheel support arm ring frame 200 rotating at the ring structure of the outer wheel 104 via the one-way transmission 303;

the lockable or releasable mechanism 900 installed between the shell of the gear train 500 and the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302, for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

Figure 17:
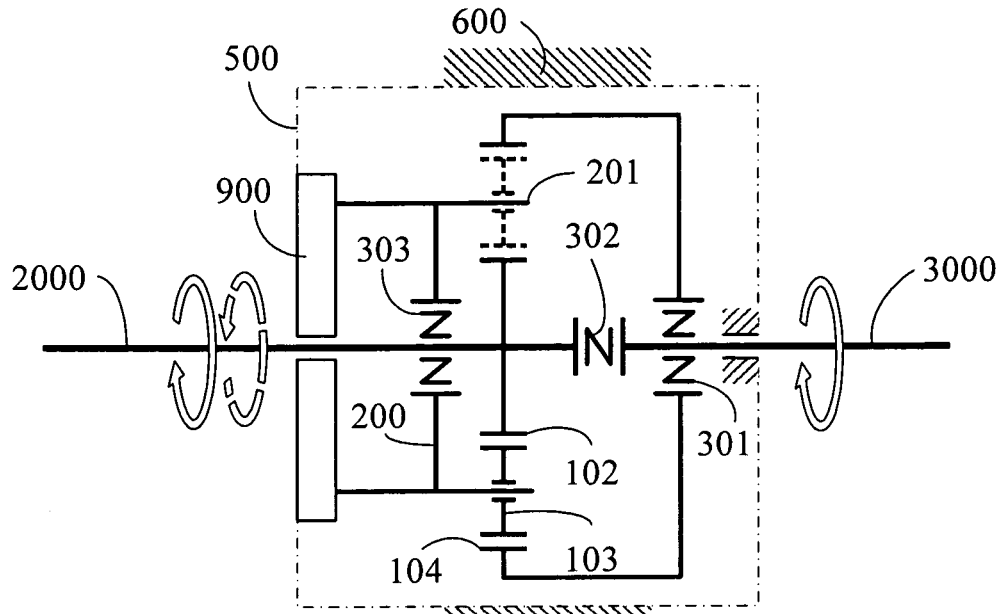
FIG. 17 is a structural schematic view showing the 15th embodiment of the lockable or releasable gear train with bidirectional input and one-way output constituted by the planetary gear train, according to the present invention.

FIG. 17 is a structural schematic view showing the 15th embodiment of the lockable or releasable gear train with bidirectional input and one-way output constituted by the planetary gear train, according to the present invention.

Figure 18:
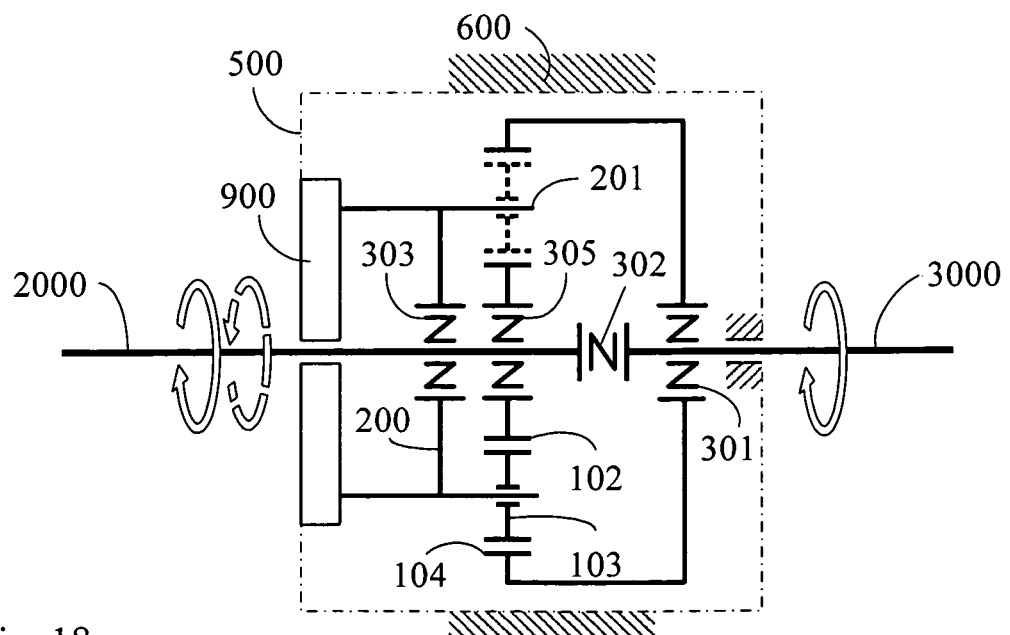
FIG. 18 is a structural schematic view showing the 16th embodiment of the lockable or releasable gear train with bidirectional input and one-way output constituted by the planetary gear train, according to the present invention.

FIG. 18 is a structural schematic view showing the 16th embodiment of the lockable or releasable gear train with bidirectional input and one-way output constituted by the planetary gear train, according to the present invention.

Figure 19:
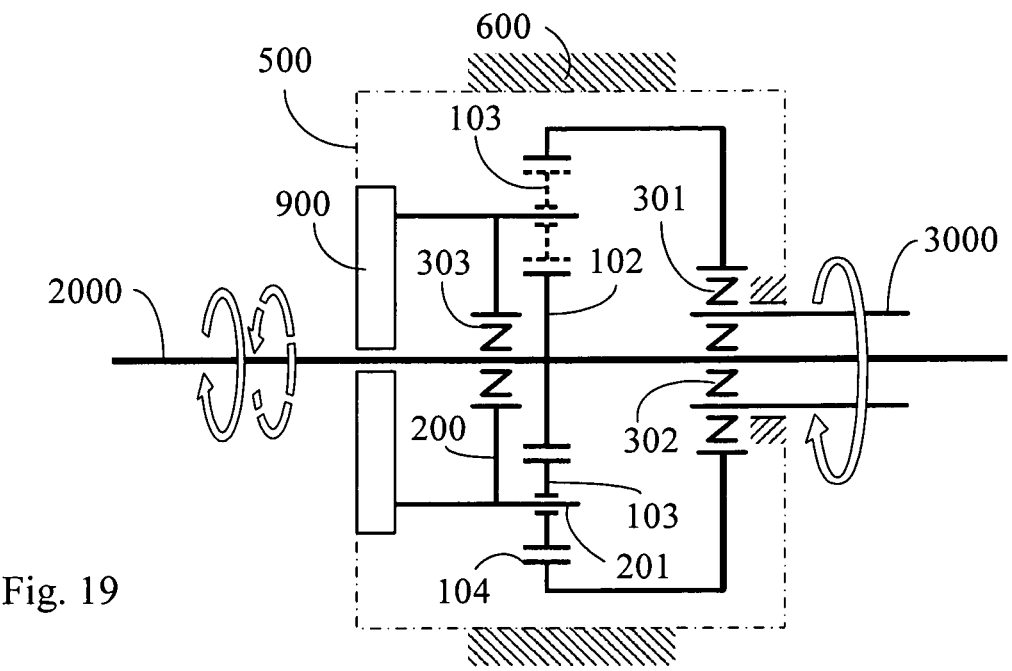
FIG. 19 is a structural schematic view showing the 17th embodiment of the lockable or releasable gear train with bidirectional input and one-way output constituted by the planetary gear train, according to the present invention.

FIG. 19 is a structural schematic view showing the 17th embodiment of the lockable or releasable gear train with bidirectional input and one-way output constituted by the planetary gear train, according to the present invention.

In which:

As shown in FIG. 17, the lockable or releasable gear train with bidirectional input and one-way output is constituted by the planetary gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with sun wheel 102;

the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, the planetary wheel support arm ring frame 200 rotating at the input shaft 2000 installed between the sun wheel 102 and the shell of the gear train 500 via the one-way transmission 303, and the lockable or releasable mechanism 900 installed between the planetary wheel support arm ring frame 200 and the shell of the gear train 500;

the shell of the gear train 500 fixed at the machine body 600;

the one-way transmission 301 installed between the ring structure of the outer wheel 104 and the output shaft 3000;

the sun wheel 102, the planetary wheel 103, and the outer wheel 104 constituted by gears or friction wheels;

the planetary wheel 103 driven by the sun wheel 102, in which the status of the transmission ratio is for acceleration, deceleration, or constant velocity;

the outer wheel 104 driven by the planetary wheel 103, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the planetary wheel support arm ring frame 200, the first driving gear train and the second driving gear train are prevented from lock status.

As shown in FIG. 18, the lockable or releasable gear train with bidirectional input and one-way output is constituted by the planetary gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- the input shaft 2000 through the sun wheel 102, and the one-way transmission 305 installed between the above both;
- the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, the planetary wheel support arm ring frame 200 rotating at the input shaft 2000 installed between the one-way transmission 305 and the shell of the gear train 500 via the one-way transmission 303, and the lockable or releasable mechanism 900 installed between the planetary wheel support arm ring frame 200 and the shell of the gear train 500;
- the shell of the gear train 500 fixed at the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the one-way transmission 305 for driving the sun wheel 102, and for further driving the planetary wheel 103 and the outer wheel 104, and through the ring structure of the outer wheel 104 and the one-way transmission 301, for driving the output shaft 3000 to produce the first rotary direction output to constitute the second driving gear train; and
- when reverse drive caused by back move occurs at the output shaft 3000, through releasing the lockable or releasable mechanism 900, idling produced between the shell of the gear train 500 and the planetary wheel support arm ring frame 200, the first driving gear train and the second driving gear train are prevented from lock status.

As shown in FIG. 19, the lockable or releasable gear train with bidirectional input and one-way output is constituted by the planetary gear train with the input shaft and the output shaft coaxial fitting, the main components including:

- one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with sun wheel 102;
- the planetary wheel 103 installed between the outer wheel 104 and the sun wheel 102; the center of the planetary wheel 103 rotating at the planetary wheel shaft 201, one end of the planetary wheel shaft 201 integrated with the planetary wheel support arm ring frame 200, the planetary wheel support arm ring frame 200 rotating at the input shaft 2000 installed between the sun wheel 102 and the shell of the gear train 500 via the one-way transmission 303, and the lockable or releasable mechanism 900 installed between the planetary wheel support arm ring frame 200 and the shell of the gear train 500;
- the shell of the gear train 500 fixed at the machine body 600;
- the one-way transmission 301 installed between the ring structure of the outer wheel 104 and the output shaft 3000;
- the sun wheel 102, the planetary wheel 103, and the outer wheel 104 constituted by gears or friction wheels;
- the planetary wheel 103 driven by the sun wheel 102, in which the status of the transmission ratio is for acceleration, deceleration, or constant velocity;
- the outer wheel 104 driven by the planetary wheel 103, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the sun wheel 102 for further driving the planetary wheel 103 and the outer wheel 104, and through the ring structure of the outer wheel 104 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the planetary wheel support arm ring frame 200, the first driving gear train and the second driving gear train are prevented from lock status.

Figure 20:
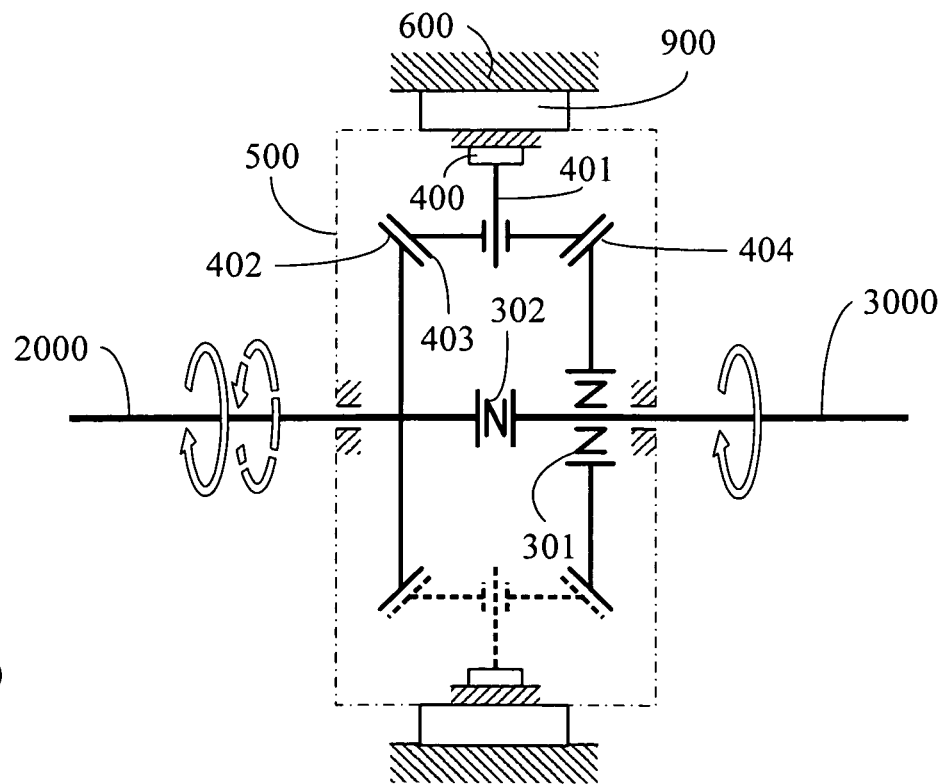
FIG. 20 is a structural schematic view showing the 1st embodiment of the lockable or releasable gear train with bidirectional input and one-way output constituted by the epicyclic gear train, according to the present invention.

For B: as shown in FIGS. 20 to 36, the lockable or releasable gear train with bidirectional input and one-way output is constituted by the epicyclic gear train; including:

FIG. 20 is a structural schematic view showing the 1st embodiment of the lockable or releasable gear train with bidirectional input and one-way output constituted by the epicyclic gear train, according to the present invention.

Figure 21:
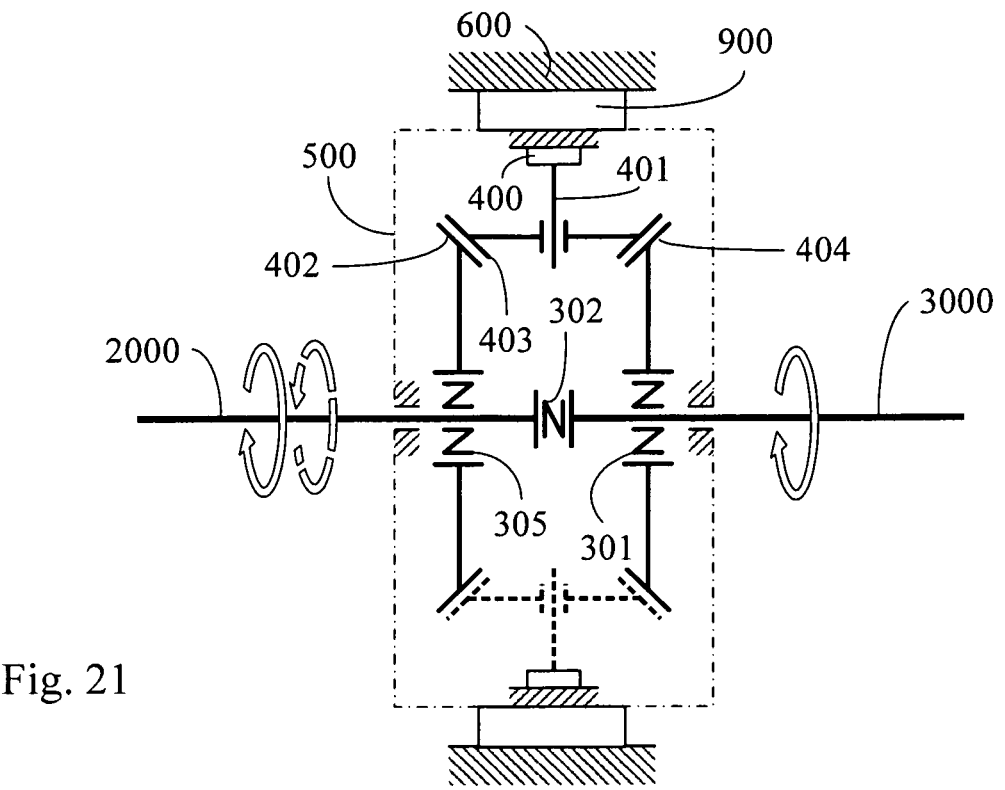
FIG. 21 is a structural schematic view showing the 2nd embodiment of the lockable or releasable gear train with bidirectional input and one-way output constituted by the epicyclic gear train, according to the present invention.

FIG. 21 is a structural schematic view showing the 2nd embodiment of the lockable or releasable gear train with bidirectional input and one-way output constituted by the epicyclic gear train, according to the present invention.

Figure 22:
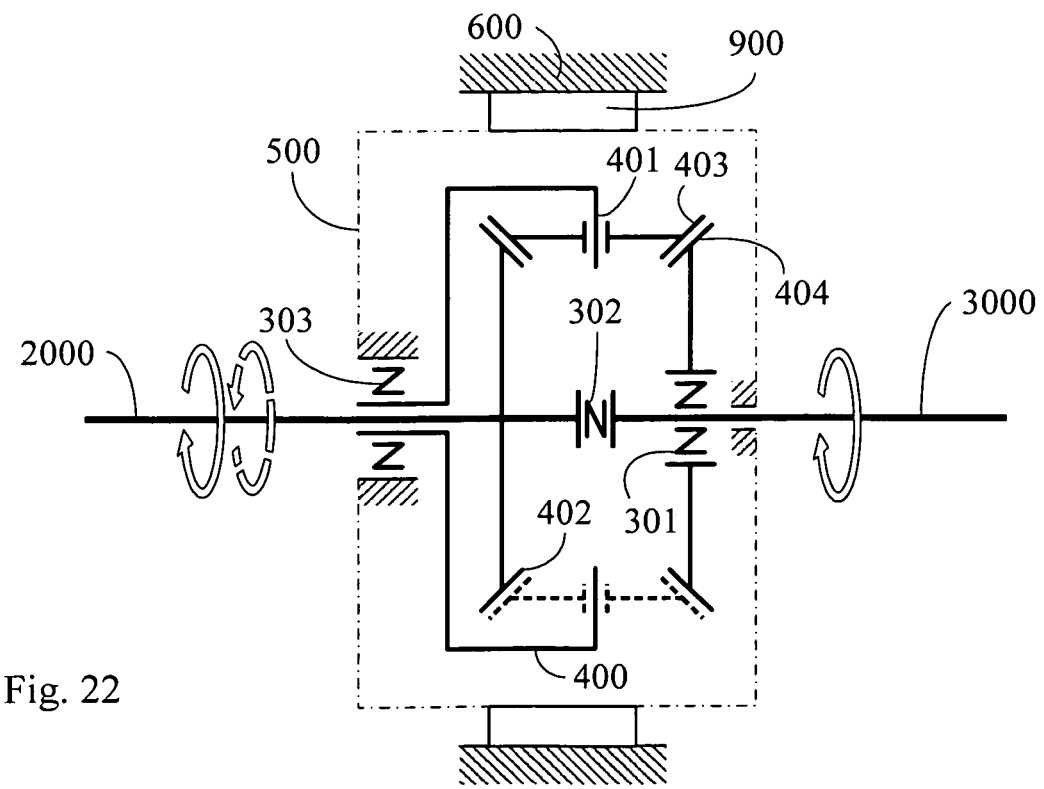
FIG. 22 is a structural schematic view showing the 3rd embodiment of the lockable or releasable gear train with bidirectional input and one-way output constituted by the epicyclic gear train, according to the present invention.

FIG. 22 is a structural schematic view showing the 3rd embodiment of the lockable or releasable gear train with bidirectional input and one-way output constituted by the epicyclic gear train, according to the present invention.

Figure 23:
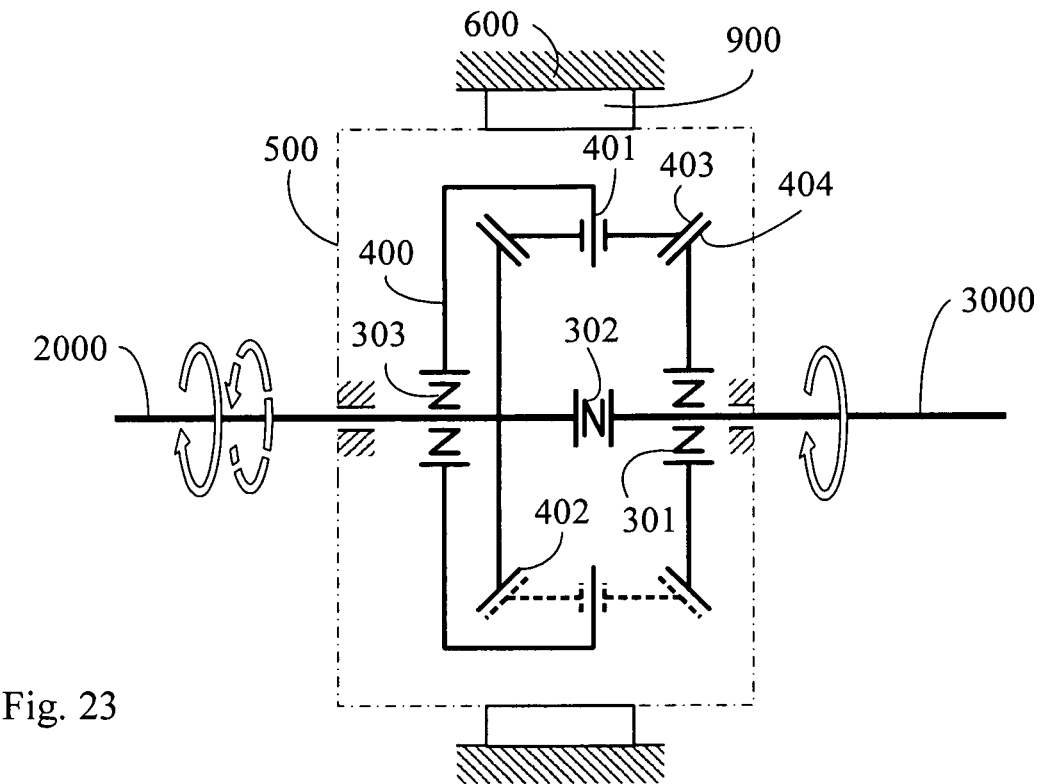
FIG. 23 is a structural schematic view showing the 4th embodiment of the lockable or releasable gear train with bidirectional input and one-way output constituted by the epicyclic gear train, according to the present invention.

FIG. 23 is a structural schematic view showing the 4th embodiment of the lockable or releasable gear train with bidirectional input and one-way output constituted by the epicyclic gear train, according to the present invention.

Figure 24:
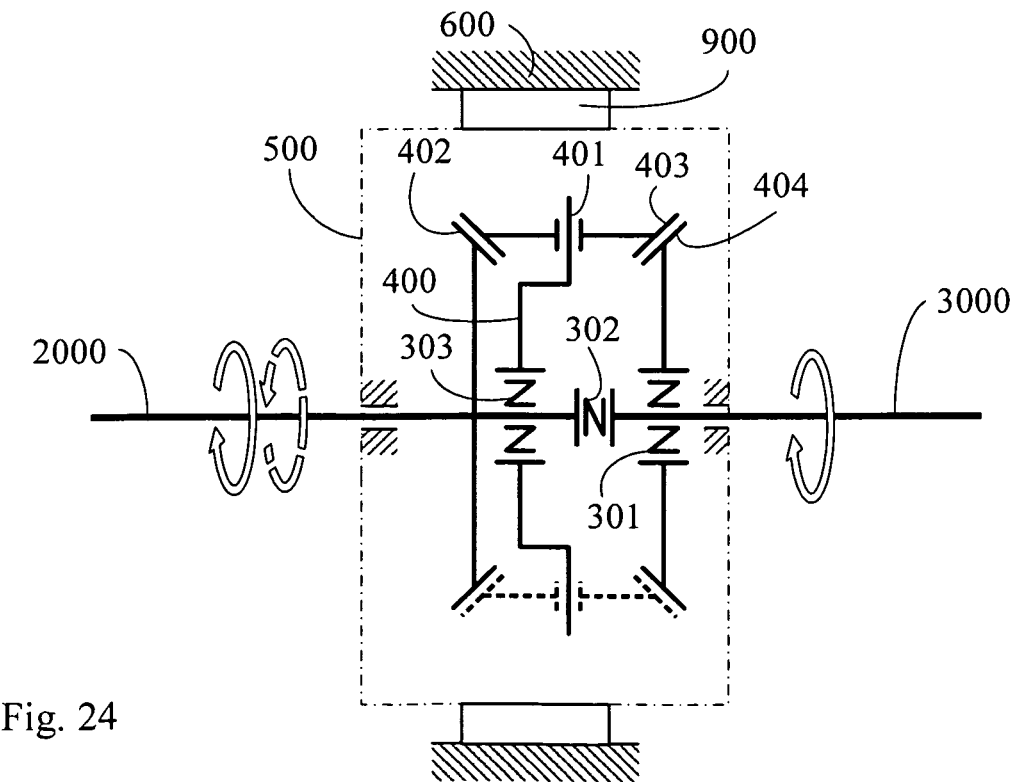
FIG. 24 is a structural schematic view showing the 5th embodiment of the lockable or releasable gear train with bidirectional input and one-way output constituted by the epicyclic gear train, according to the present invention.

FIG. 24 is a structural schematic view showing the 5th embodiment of the lockable or releasable gear train with bidirectional input and one-way output constituted by the epicyclic gear train, according to the present invention.

Figure 25:
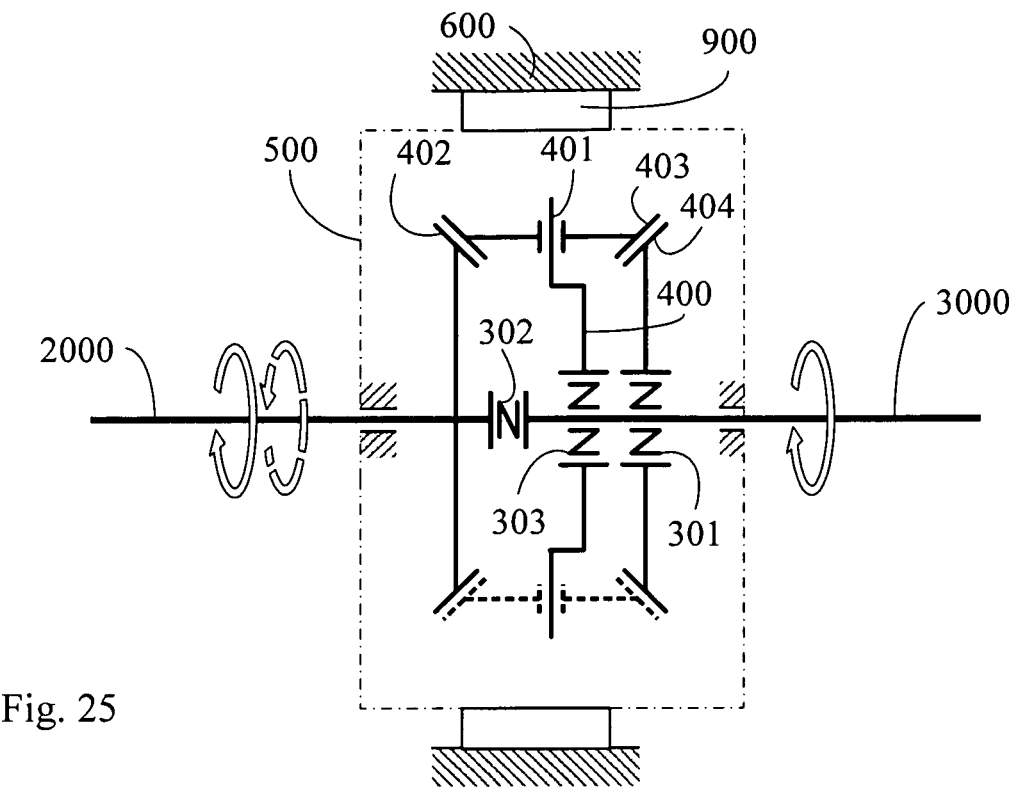
FIG. 25 is a structural schematic view showing the 6th embodiment of the lockable or releasable gear train with bidirectional input and one-way output constituted by the epicyclic gear train, according to the present invention.

FIG. 25 is a structural schematic view showing the 6th embodiment of the lockable or releasable gear train with bidirectional input and one-way output constituted by the epicyclic gear train, according to the present invention.

Figure 26:
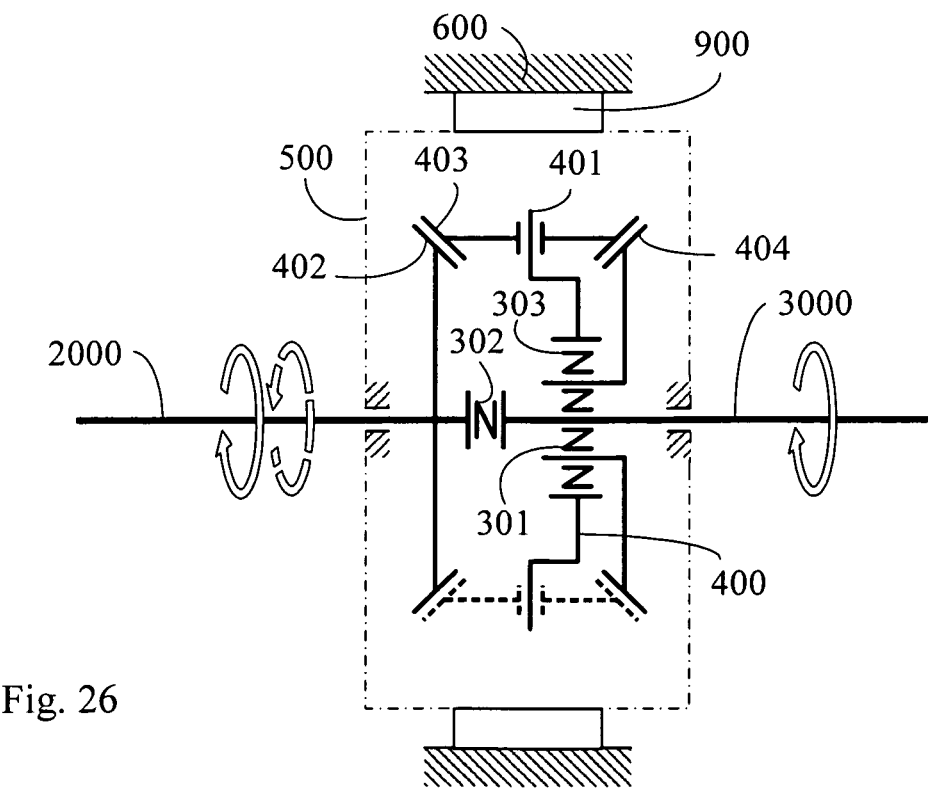
FIG. 26 is a structural schematic view showing the 7th embodiment of the lockable or releasable gear train with bidirectional input and one-way output constituted by the epicyclic gear train, according to the present invention.

FIG. 26 is a structural schematic view showing the 7th embodiment of the lockable or releasable gear train with bidirectional input and one-way output constituted by the epicyclic gear train, according to the present invention.

Figure 27:
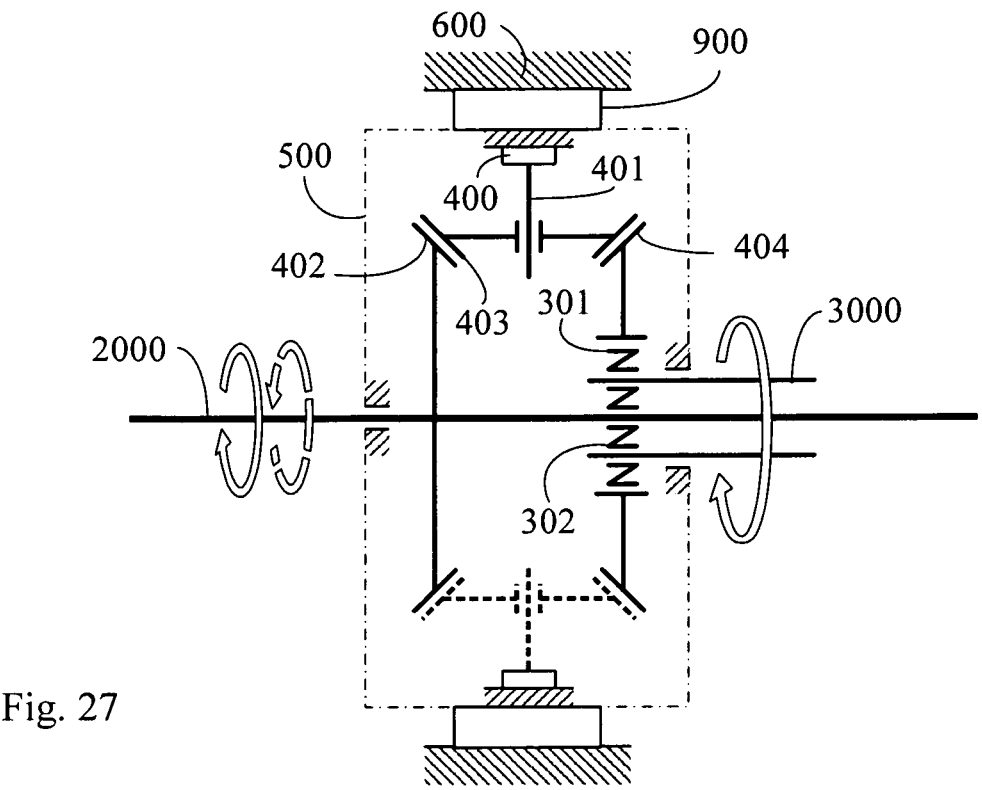
FIG. 27 is a structural schematic view showing the 8th embodiment of the lockable or releasable gear train with bidirectional input and one-way output constituted by the epicyclic gear train, according to the present invention.

FIG. 27 is a structural schematic view showing the 8th embodiment of the lockable or releasable gear train with bidirectional input and one-way output constituted by the epicyclic gear train, according to the present invention.

Figure 28:
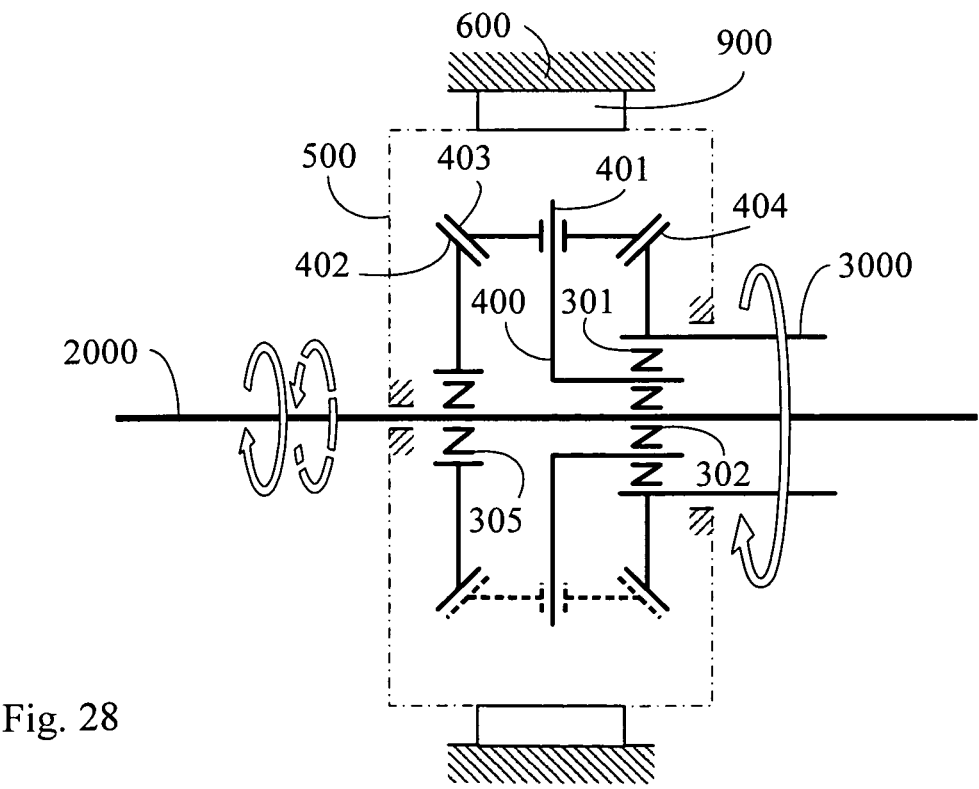
FIG. 28 is a structural schematic view showing the 9th embodiment of the lockable or releasable gear train with bidirectional input and one-way output constituted by the epicyclic gear train, according to the present invention.

FIG. 28 is a structural schematic view showing the 9th embodiment of the lockable or releasable gear train with bidirectional input and one-way output constituted by the epicyclic gear train, according to the present invention.

Figure 29:
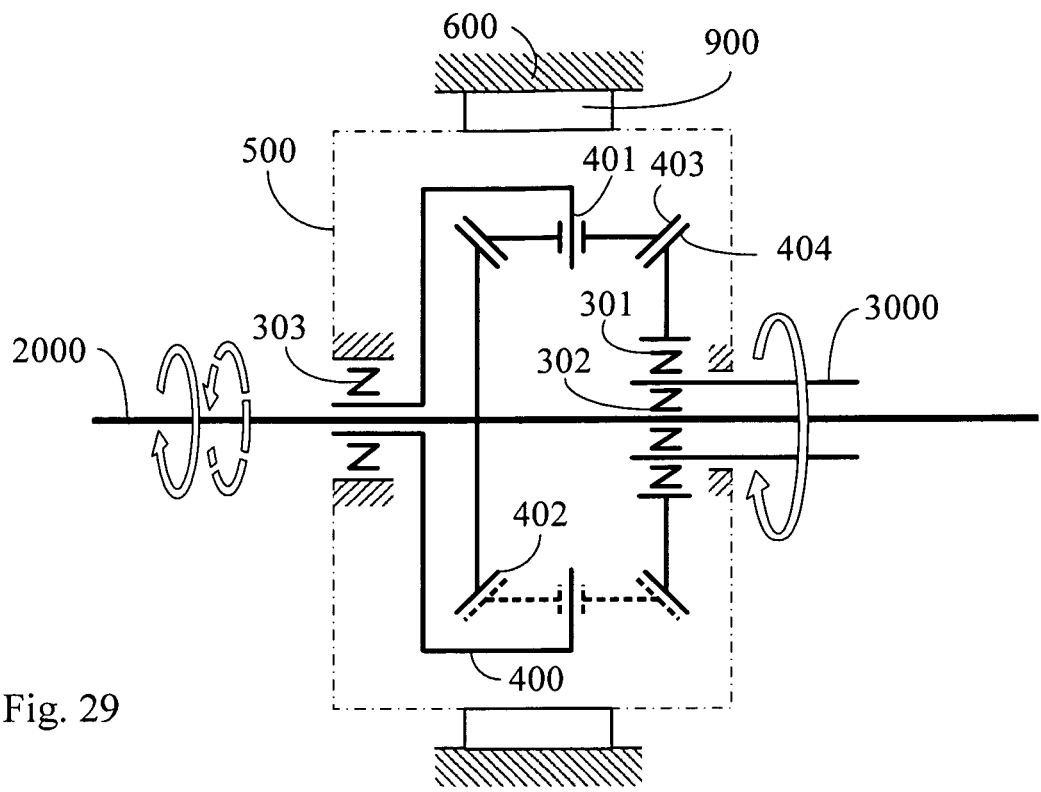
FIG. 29 is a structural schematic view showing the 10th embodiment of the lockable or releasable gear train with bidirectional input and one-way output constituted by the epicyclic gear train, according to the present invention.

FIG. 29 is a structural schematic view showing the 10th embodiment of the lockable or releasable gear train with bidirectional input and one-way output constituted by the epicyclic gear train, according to the present invention.

Figure 30:
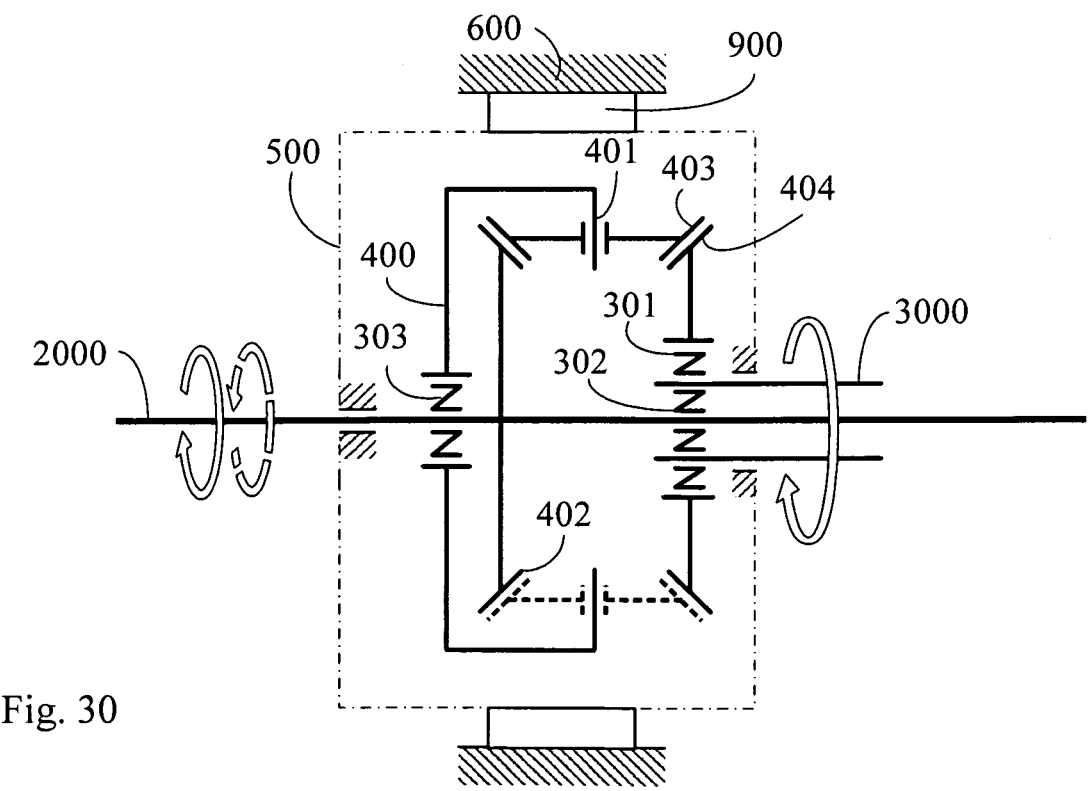
FIG. 30 is a structural schematic view showing the 11th embodiment of the lockable or releasable gear train with bidirectional input and one-way output constituted by the epicyclic gear train, according to the present invention.

FIG. 30 is a structural schematic view showing the 11th embodiment of the lockable or releasable gear train with bidirectional input and one-way output constituted by the epicyclic gear train, according to the present invention.

Figure 31:
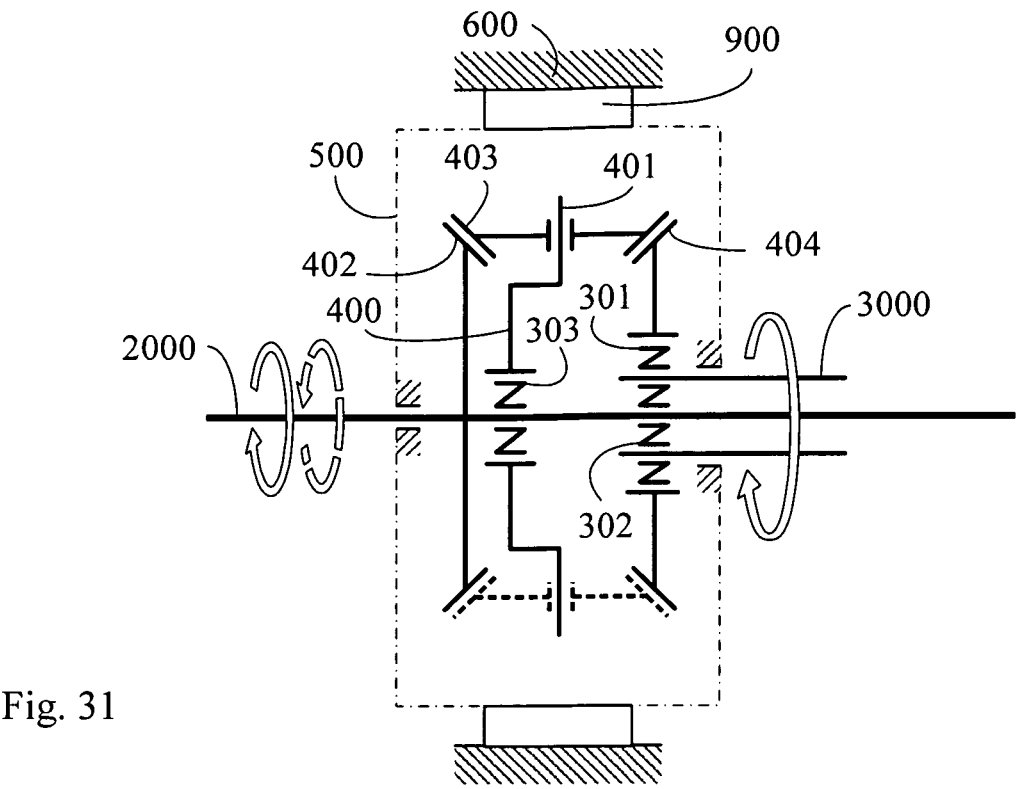
FIG. 31 is a structural schematic view showing the 12th embodiment of the lockable or releasable gear train with bidirectional input and one-way output constituted by the epicyclic gear train, according to the present invention.

FIG. 31 is a structural schematic view showing the 12th embodiment of the lockable or releasable gear train with bidirectional input and one-way output constituted by the epicyclic gear train, according to the present invention.

Figure 32:
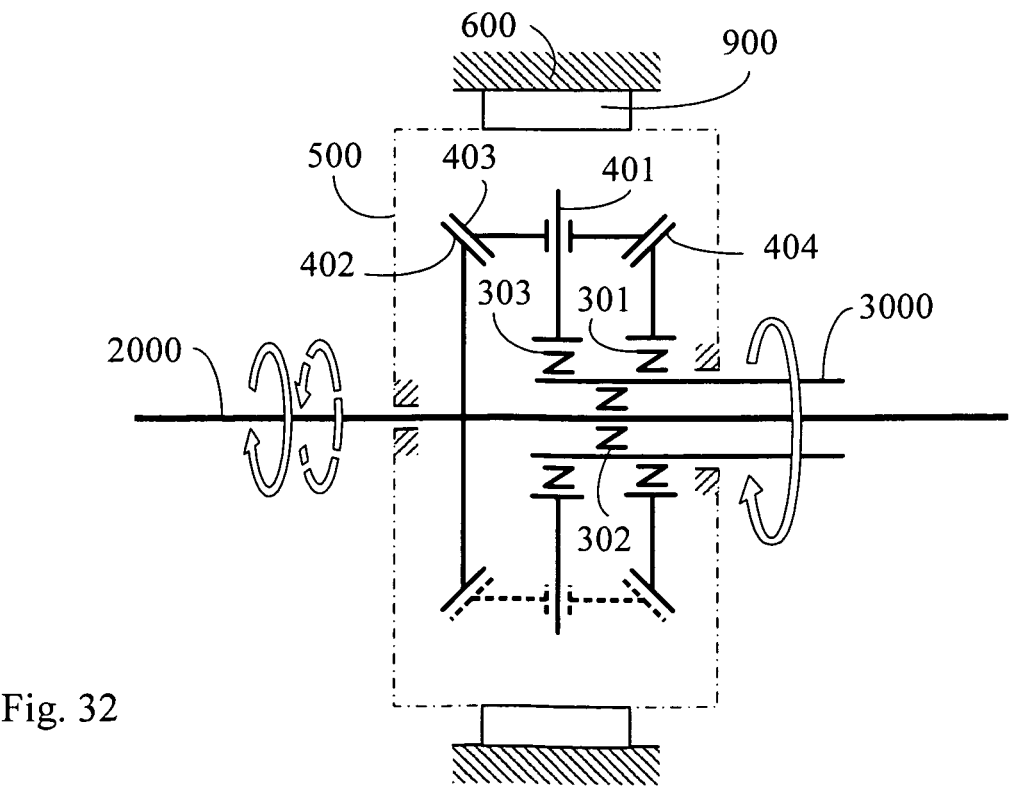
FIG. 32 is a structural schematic view showing the 13th embodiment of the lockable or releasable gear train with bidirectional input and one-way output constituted by the epicyclic gear train, according to the present invention.

FIG. 32 is a structural schematic view showing the 13th embodiment of the lockable or releasable gear train with bidirectional input and one-way output constituted by the epicyclic gear train, according to the present invention.

Figure 33:
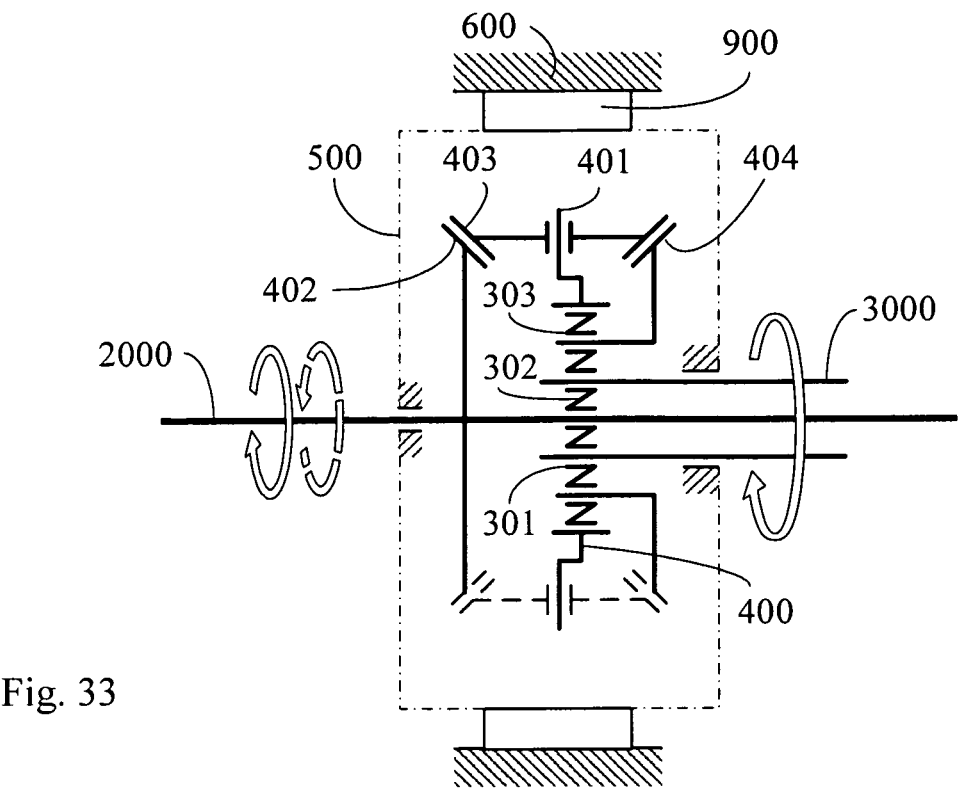
FIG. 33 is a structural schematic view showing the 14th embodiment of the lockable or releasable gear train with bidirectional input and one-way output constituted by the epicyclic gear train, according to the present invention.

FIG. 33 is a structural schematic view showing the 14th embodiment of the lockable or releasable gear train with bidirectional input and one-way output constituted by the epicyclic gear train, according to the present invention.

Figure 34:
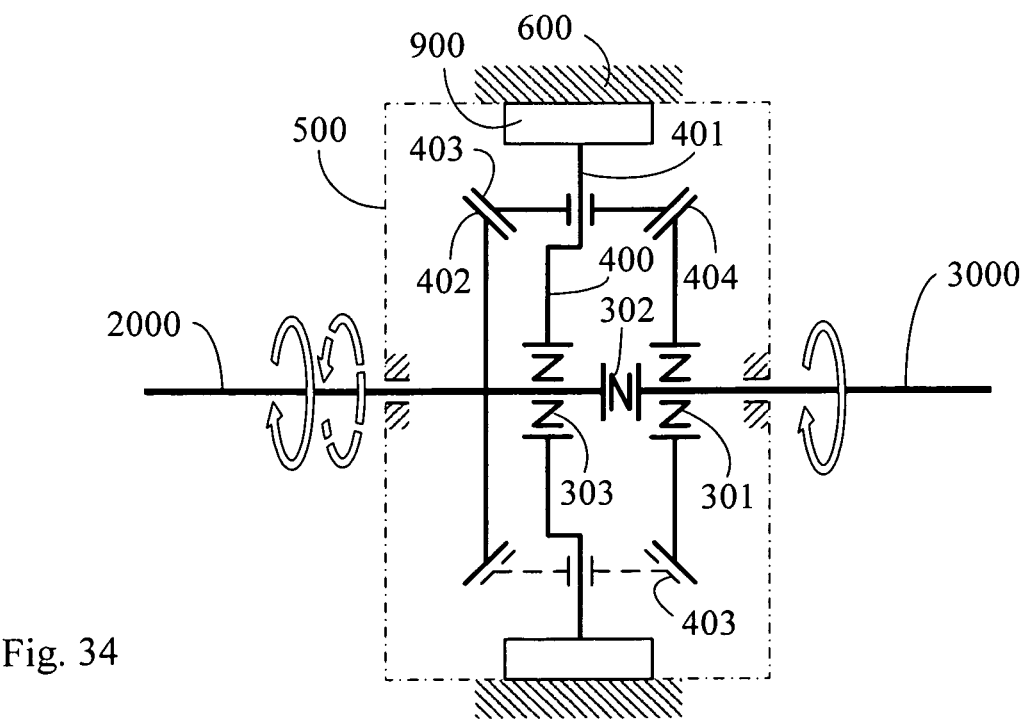
FIG. 34 is a structural schematic view showing the 15th embodiment of the lockable or releasable gear train with bidirectional input and one-way output constituted by the epicyclic gear train, according to the present invention.

FIG. 34 is a structural schematic view showing the 15th embodiment of the lockable or releasable gear train with bidirectional input and one-way output constituted by the epicyclic gear train, according to the present invention.

Figure 35:
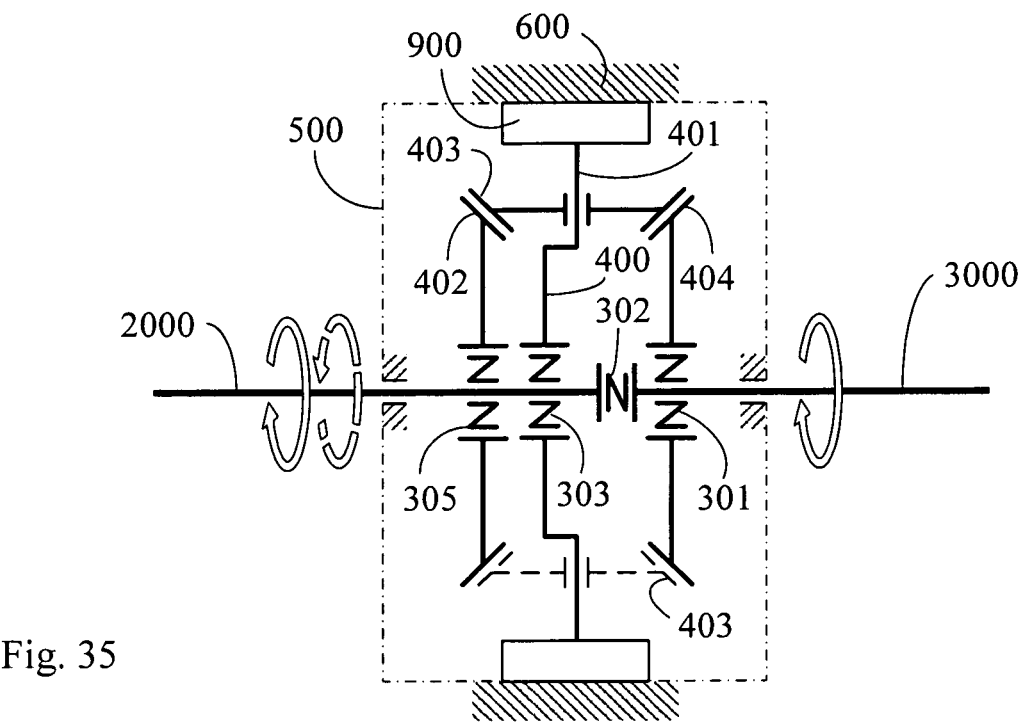
FIG. 35 is a structural schematic view showing the 16th embodiment of the lockable or releasable gear train with bidirectional input and one-way output constituted by the epicyclic gear train, according to the present invention.

FIG. 35 is a structural schematic view showing the 16th embodiment of the lockable or releasable gear train with bidirectional input and one-way output constituted by the epicyclic gear train, according to the present invention.

Figure 36:
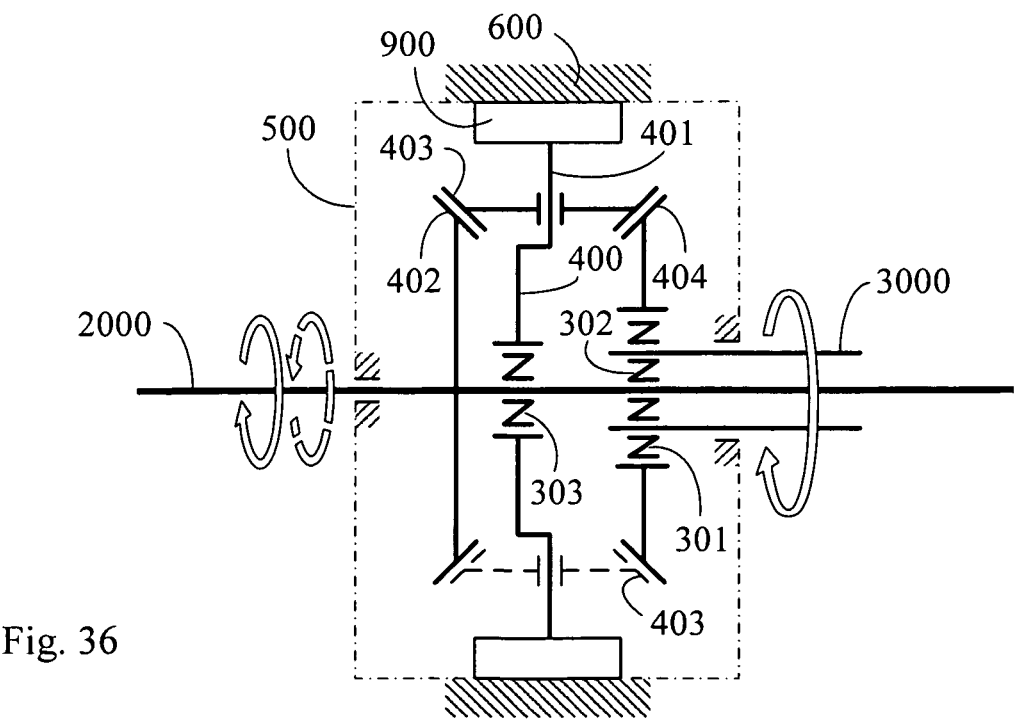
FIG. 36 is a structural schematic view showing the 17th embodiment of the lockable or releasable gear train with bidirectional input and one-way output constituted by the epicyclic gear train, according to the present invention.

FIG. 36 is a structural schematic view showing the 17th embodiment of the lockable or releasable gear train with bidirectional input and one-way output constituted by the epicyclic gear train, according to the present invention.

In which:

As shown in FIG. 20, the lockable or releasable gear train with bidirectional input and one-way output is constituted by the epicyclic gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with inward oblique wheel 402;

an epicyclic gear 403 installed between an outward oblique wheel 404 and an inward oblique wheel 402; the center of the epicyclic gear 403 rotating at an epicyclic gear shaft 401; and one end of the epicyclic gear shaft 401 fixed at the shell of the gear train 500;

the lockable or releasable mechanism 900 installed between the shell of the gear train 500 and the machine body 600;

the one-way transmission 301 installed between the outward oblique wheel 404 and the output shaft 3000;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402 for further driving the epicyclic gear 403 and the outward oblique wheel 404, and through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 21, the lockable or releasable gear train with bidirectional input and one-way output is constituted by the epicyclic gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 through inward oblique wheel 402, and one-way transmission 305 installed between the above both;

the epicyclic gear 403 installed between the outward oblique wheel 404 and the inward oblique wheel 402; the center of the epicyclic gear 403 rotating at the epicyclic gear shaft 401, and one end of the epicyclic gear shaft 401 fixed at the shell of the gear train 500;

the lockable or releasable mechanism 900 installed between the shell of the gear train 500 and the machine body 600;

the one-way transmission 301 installed between the outward oblique wheel 404 and the output shaft 3000;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 for driving the inward oblique wheel 402 and for further driving the epicyclic gear 403 and the outward oblique wheel 404, and through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 22, the lockable or releasable gear train with bidirectional input and one-way output is constituted by the epicyclic gear train with the input shaft and the output shaft coaxially installed in series, the main components including:

one end of the input shaft 2000 through installed at an epicyclic gear support arm ring frame 400 via bearing structure, the epicyclic gear support arm ring frame 400 integrated with one side of the shell of the gear train 500 via the one-way transmission 303, and another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with inward oblique wheel 402;

the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400 and rotating between the input shaft 2000 and the one-way transmission 303;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 23, the lockable or releasable gear train with bidirectional input and one-way output is constituted by the epicyclic gear train with the input shaft and the output shaft coaxially installed in series, the main components including:
- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with inward oblique wheel 402;
- the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400, and the epicyclic gear support arm ring frame 400 rotating at the input shaft 2000 between the shell of the gear train 500 and the inward oblique wheel 402 via the one-way transmission 303;
- the lockable or releasable mechanism 900 installed between the shell of the gear train 500 and the machine body 600;
- the outward oblique wheel 404 surrounding the output shaft 3000 via the one-way transmission 301;
- the inward oblique wheel 402, the epicyclic gear 403, and the outward oblique wheel 404 constituted by gears or friction wheels;
- the epicyclic gear 403 driven by the inward oblique wheel 402, in which the status of the transmission ratio is for acceleration, deceleration, or constant velocity;
- the outward oblique wheel 404 driven by the epicyclic gear 403, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and
- when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 24, the lockable or releasable gear train with bidirectional input and one-way output is constituted by the epicyclic gear train with the input shaft and the output shaft coaxially installed in series, the main components including:
- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 integrated with inward oblique wheel 402;
- the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400 installed between the inward oblique wheel 402 and the one-way transmission 302, and the one-way transmission 303 installed between the epicyclic gear support arm ring frame 400 and the input shaft 2000;
- the lockable or releasable mechanism 900 installed between the shell of the gear train 500 and the machine body 600;
- the outward oblique wheel 404 surrounding the output shaft 3000 via the one-way transmission 301;
- the inward oblique wheel 402, the epicyclic gear 403, and the outward oblique wheel 404 constituted by gears or friction wheels;
- the epicyclic gear 403 driven by the inward oblique wheel 402, in which the status of the transmission ratio is for acceleration, deceleration, or constant velocity;
- the outward oblique wheel 404 driven by the epicyclic gear 403, in which the status of the transmission ratio is for acceleration, deceleration, or constant velocity;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and
- when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 25, the lockable or releasable gear train with bidirectional input and one-way output is constituted by the epicyclic gear train with the input shaft and the output shaft coaxially installed in series, the main components including:
- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400 installed at the output shaft 3000, and the one-way transmission 303 installed between the epicyclic gear support arm ring frame 400 and the output shaft 3000;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 26, the lockable or releasable gear train with bidirectional input and one-way output is constituted by the epicyclic gear train with the input shaft and the output shaft coaxially installed in series, the main components including:

one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400, and the one-way transmission 303 installed between the epicyclic gear support arm ring frame 400 and the outward oblique wheel 404;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 27, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 integrated with inward oblique wheel 402;

the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400, the epicyclic gear support arm ring frame 400 fixed at the shell of the gear train 500;

the lockable or releasable mechanism 900 installed between the shell of the gear train 500 and the machine body 600;

the one-way transmission 301 installed between the outward oblique wheel 404 and the output shaft 3000;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, for further driving the epicyclic gear 403 and the outward oblique wheel 404, and through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 28, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, the epicyclic gear support arm ring frame 400 and the one-way transmission 301, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 through the inward oblique wheel 402, and the one-way transmission 305 installed between the above both;

the epicyclic gear 403 installed between the outward oblique wheel 404 and the inward oblique wheel 402; the epicyclic gear 403 rotating at the epicyclic gear shaft 401, the epicyclic gear shaft 401 installed at the epicyclic gear support arm ring frame 400, and the epicyclic gear support arm ring frame 400 coaxially installed between the one-way transmission 301 and the one-way transmission 302;

the lockable or releasable mechanism 900 installed between the shell of the gear train 500 and the machine body 600;

the one-way transmission 301 installed between the outward oblique wheel 404 and the epicyclic gear support arm ring frame 400;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 and the one-way transmission 301, for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 for driving the epicyclic gear 403 and the outward oblique wheel 404, and for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 29, the lockable or releasable gear train with bidirectional input and one-way output is constituted by the epicyclic gear train with the input shaft and the output shaft coaxial fitting, the main components including:

one end of the input shaft 2000 through installed at the epicyclic gear support arm ring frame 400 via bearing structure, the epicyclic gear support arm ring frame 400 integrated with one side of the shell of the gear train 500 via the one-way transmission 303, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400, and the epicyclic gear support arm ring frame 400 rotating between the input shaft 2000 and the one-way transmission 303;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 30, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400 near the shell of the gear train 500, and the one-way transmission 303 installed between the epicyclic gear support arm ring frame 400 and the input shaft 2000;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 31, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400 installed between the inward oblique wheel 402 and the one-way transmission 302, and the one-way transmission 303 installed between the epicyclic gear support arm ring frame 400 and the input shaft 2000;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 32, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400 installed at the output shaft 3000, and the one-way transmission 303 installed between the epicyclic gear support arm ring frame 400 and the output shaft 3000;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 33, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, the epicyclic gear shaft 401 integrated with the epicyclic gear support arm ring frame 400, and the one-way transmission 303 installed between the epicyclic gear support arm ring frame 400 and the outward oblique wheel 404;

the lockable or releasable mechanism 900 installed between the shell of the gear train 500 and the machine body 600;

the outward oblique wheel 404 surrounding the output shaft 3000 via the one-way transmission 301;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, the epicyclic gear 403, and the outward oblique wheel 404, and then through the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 34, the lockable or releasable gear train with bidirectional input and one-way output is constituted by the epicyclic gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- the input shaft 2000 integrated with the inward oblique wheel 402;
- the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400, and the epicyclic gear support arm ring frame 400 through the one-way transmission 303 for rotating at the input shaft 2000 installed between the one-way transmission 302 and the inward oblique wheel 402;
- the lockable or releasable mechanism 900 installed between the epicyclic gear support arm ring frame 400 and the shell of the gear train 500;
- the shell of the gear train 500 fixed at the machine body 600;
- the one-way transmission 301 installed between the outward oblique wheel 404 and the output shaft 3000;
- the inward oblique wheel 402, the epicyclic gear 403, and the outward oblique wheel 404 constituted by gears or friction wheels;
- the epicyclic gear 403 driven by the inward oblique wheel 402, in which the status of the transmission ratio is for acceleration, deceleration, or constant velocity;
- the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, for further driving the epicyclic gear 403 and the outward oblique wheel 404, and then through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the epicyclic gear support arm ring frame 400, the first driving gear train and the second driving gear train are prevented from lock status.

As shown in FIG. 35, the lockable or releasable gear train with bidirectional input and one-way output is constituted by the epicyclic gear train with the input shaft and the output shaft coaxially installed in series, the main components including:

- one end of the input shaft 2000 through installed at one side of the shell of the gear train 500 via bearing structure, another end of the input shaft 2000 and the output shaft 3000 coaxially installed in series via the one-way transmission 302, and a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- the input shaft 2000 through the inward oblique wheel 402, and the one-way transmission 305 installed between the above both;
- the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400, and the epicyclic gear support arm ring frame 400 through the one-way transmission 303 for rotating at the input shaft 2000 installed between the one-way transmission 302 and the one-way transmission 305;
- the lockable or releasable mechanism 900 installed between the epicyclic gear support arm ring frame 400 and the shell of the gear train 500;
- the shell of the gear train 500 fixed at the machine body 600;
- the one-way transmission 301 installed between the outward oblique wheel 404 and the output shaft 3000;
- the inward oblique wheel 402, the epicyclic gear 403, and the outward oblique wheel 404 constituted by gears or friction wheels;
- the epicyclic gear 403 driven by the inward oblique wheel 402, in which the status of the transmission ratio is for acceleration, deceleration, or constant velocity;
- the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 for driving the inward oblique wheel 402, and for further driving the epicyclic gear 403 and the outward oblique wheel 404, and then through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the epicyclic gear support arm ring frame 400, the first driving gear train and the second driving gear train are prevented from lock status.

As shown in FIG. 36, the lockable or releasable gear train with bidirectional input and one-way output is constituted by the epicyclic gear train with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 302, and a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

the input shaft 2000 integrated with the inward oblique wheel 402;

the epicyclic gear 403 installed between the outward oblique wheel 404 and the inward oblique wheel 402; the center of the epicyclic gear 403 rotating at the epicyclic gear shaft 401, one end of the epicyclic gear shaft 401 integrated with the epicyclic gear support arm ring frame 400, and the epicyclic gear support arm ring frame 400 through the one-way transmission 303 for rotating at the input shaft 2000 installed between the inward oblique wheel 402 and the one-way transmission 302;

the lockable or releasable mechanism 900 installed between the epicyclic gear support arm ring frame 400 and the shell of the gear train 500;

the shell of the gear train 500 fixed at the machine body 600;

the one-way transmission 301 installed between the outward oblique wheel 404 and the output shaft 3000;

the inward oblique wheel 402, the epicyclic gear 403, and the outward oblique wheel 404 constituted by gears or friction wheels;

the epicyclic gear 403 driven by the inward oblique wheel 402, in which the status of the transmission ratio is for acceleration, deceleration, or constant velocity;

the outward oblique wheel 404 driven by the epicyclic gear 403, in which the status of the transmission ratio is for acceleration, deceleration, or constant velocity;

by way of the above structure, the input shaft 2000 driven at the first rotary direction, through the one-way transmission 302 for driving the output shaft 3000 to produce the first rotary direction output to constitute the first driving gear train;

by way of the above structure, if the lockable or releasable mechanism 900 is locked, the input shaft 2000 is driven at the second rotary direction, through the inward oblique wheel 402, for further driving the epicyclic gear 403 and the outward oblique wheel 404, and then through the outward oblique wheel 404 and the one-way transmission 301, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the epicyclic gear support arm ring frame 400, the first driving gear train and the second driving gear train are prevented from lock status.

Figure 37:
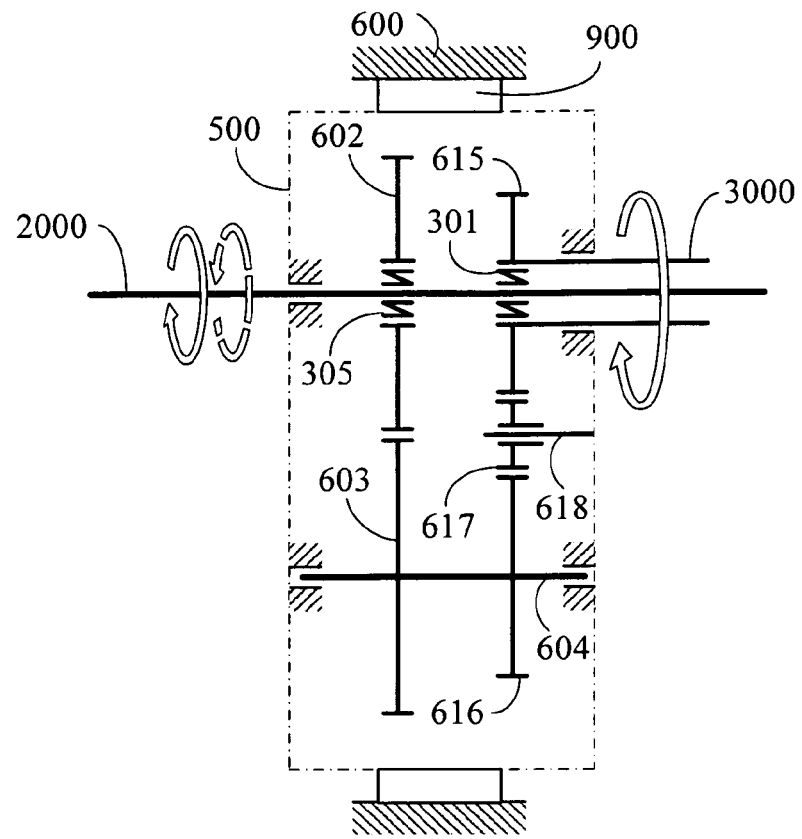
FIG. 37 is a structural schematic view showing the 1st embodiment of the lockable or releasable gear train with bidirectional input and one-way output constituted by integrating with the transmission with different drive rotary direction, according to the present invention.

For C: as shown in FIGS. 37 to 42, the lockable or releasable gear train with bidirectional input and one-way output is constituted by integrating with the transmission with different drive rotary direction, including:

FIG. 37 is a structural schematic view showing the 1st embodiment of the lockable or releasable gear train with bidirectional input and one-way output constituted by integrating with the transmission with different drive rotary direction, according to the present invention.

Figure 38:
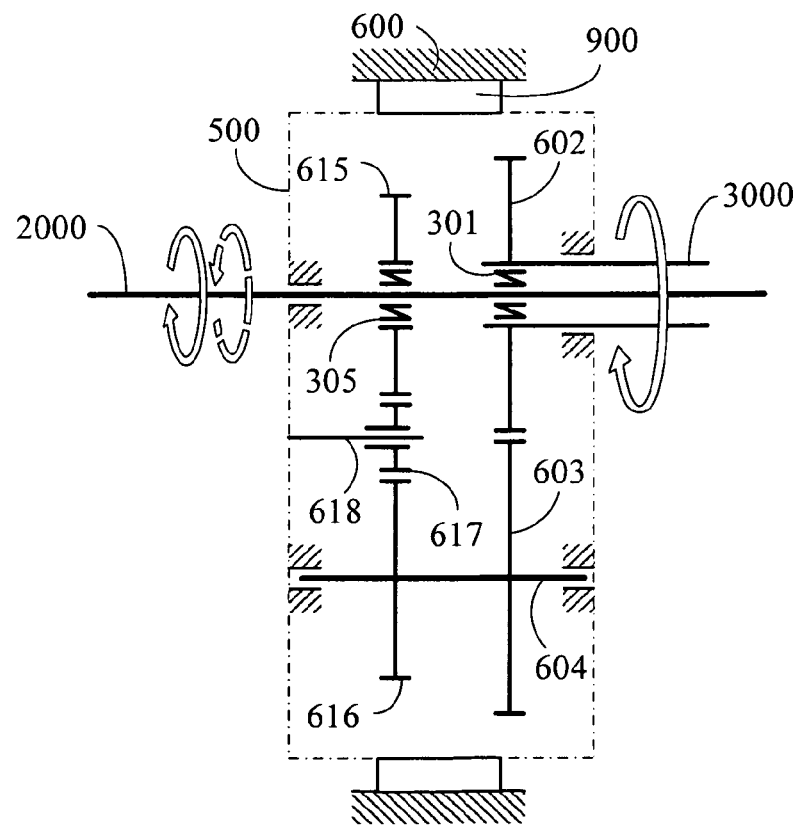
FIG. 38 is a structural schematic view showing the 2nd embodiment of the lockable or releasable gear train with bidirectional input and one-way output constituted by integrating with the transmission with different drive rotary direction, according to the present invention.

FIG. 38 is a structural schematic view showing the 2nd embodiment of the lockable or releasable gear train with bidirectional input and one-way output constituted by integrating with the transmission with different drive rotary direction, according to the present invention.

Figure 39:
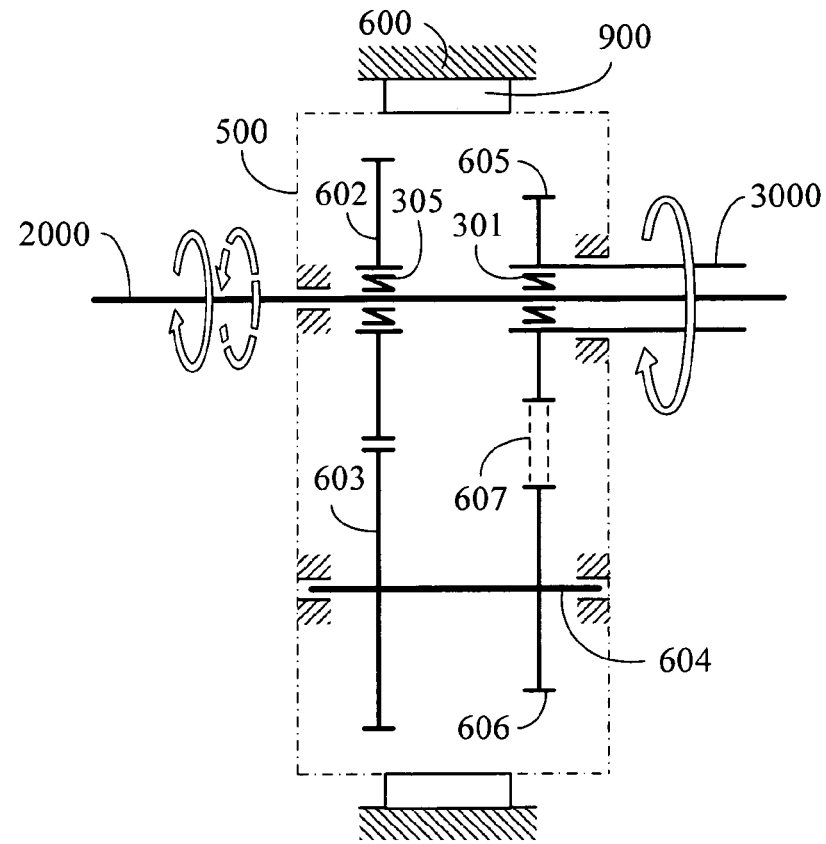
FIG. 39 is a structural schematic view showing the 3rd embodiment of the lockable or releasable gear train with bidirectional input and one-way output constituted by integrating with the transmission with different drive rotary direction, according to the present invention.

FIG. 39 is a structural schematic view showing the 3rd embodiment of the lockable or releasable gear train with bidirectional input and one-way output constituted by integrating with the transmission with different drive rotary direction, according to the present invention.

Figure 40:
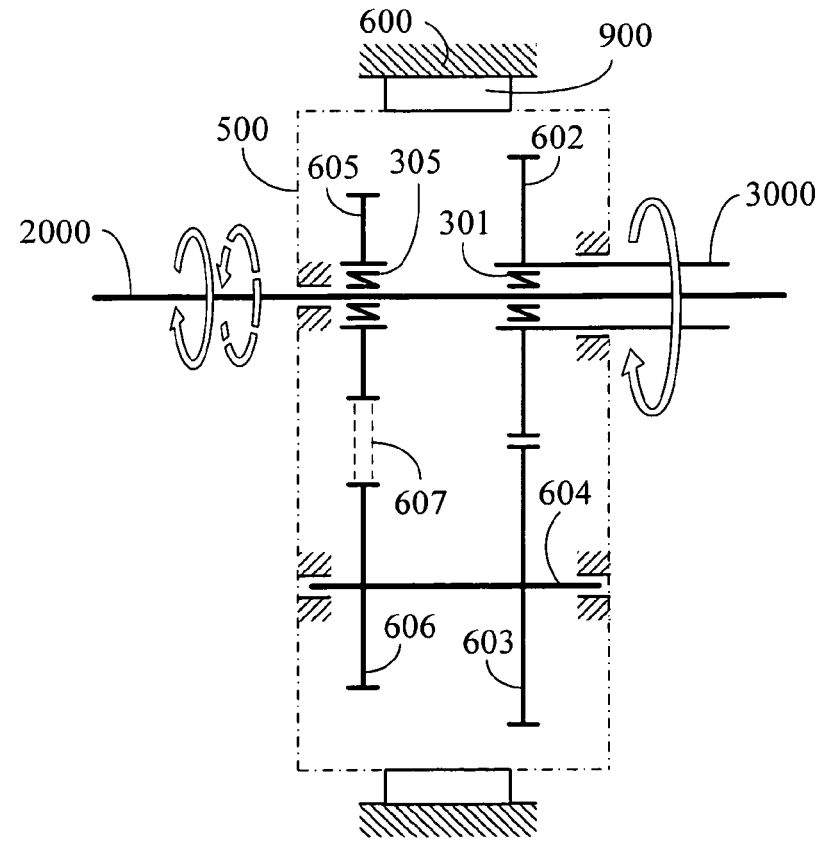
FIG. 40 is a structural schematic view showing the 4th embodiment of the lockable or releasable gear train with bidirectional input and one-way output constituted by integrating with the transmission with different drive rotary direction, according to the present invention.

FIG. 40 is a structural schematic view showing the 4th embodiment of the lockable or releasable gear train with bidirectional input and one-way output constituted by integrating with the transmission with different drive rotary direction, according to the present invention.

Figure 41:
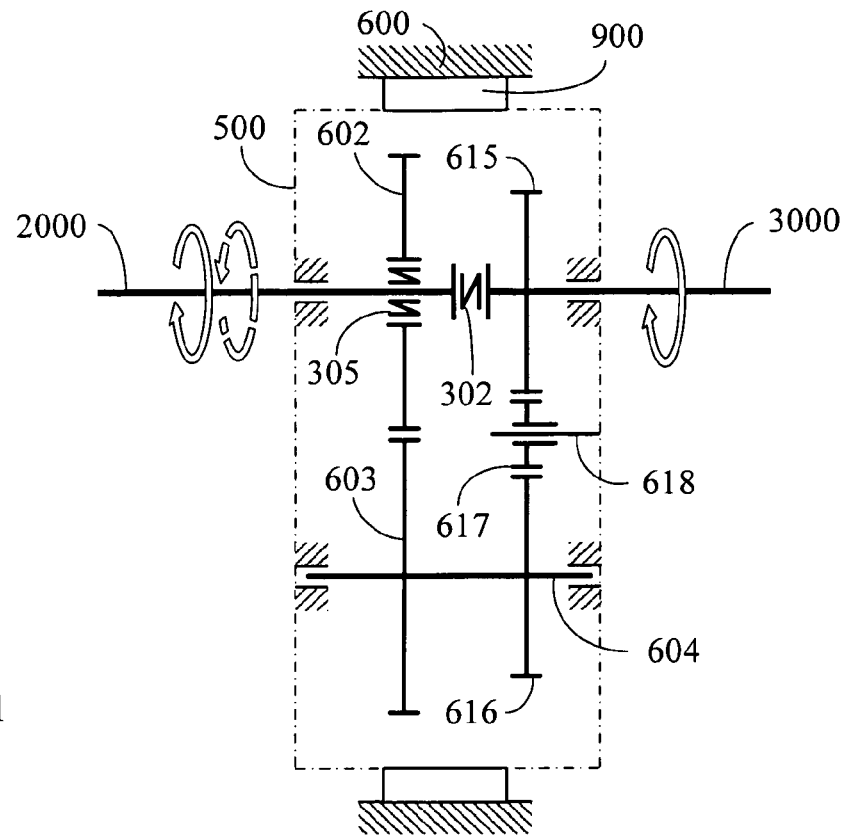
FIG. 41 is a structural schematic view showing the 5th embodiment of the lockable or releasable gear train with bidirectional input and one-way output constituted by integrating with the transmission with different drive rotary direction, according to the present invention.

FIG. 41 is a structural schematic view showing the 5th embodiment of the lockable or releasable gear train with bidirectional input and one-way output constituted by integrating with the transmission with different drive rotary direction, according to the present invention.

Figure 42:
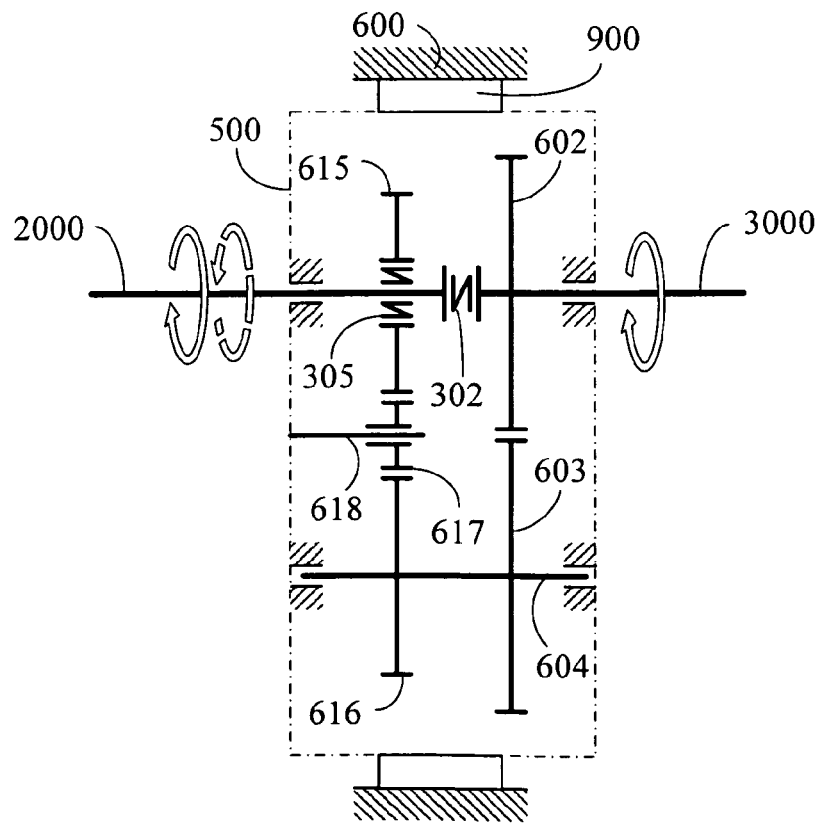
FIG. 42 is a structural schematic view showing the 6th embodiment of the lockable or releasable gear train with bidirectional input and one-way output constituted by integrating with the transmission with different drive rotary direction, according to the present invention.

FIG. 42 is a structural schematic view showing the 6th embodiment of the lockable or releasable gear train with bidirectional input and one-way output constituted by integrating with the transmission with different drive rotary direction, according to the present invention.

In which:

As shown in FIG. 37, the lockable or releasable gear train with bidirectional input and one-way output is constituted by integrating with the transmission with different drive rotating direction with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 301, a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 through driving wheel 602, and the one-way transmission 305 installed between the above both;

the rotary direction of driving wheel 602 being different from that of driving wheel 603, driving wheel 603 and driving wheel 616 co-integrated with revolving shaft 604, and a bearing installed between the revolving shaft 604 and the shell of the gear train 500;

driving wheel 616 rotating at driving wheel 617 of revolving shaft 618, and then driving the driving wheel 615 for constituting driving wheel set with same rotary direction;

the revolving shaft 618 integrated with the shell of the gear train 500, and the driving wheel 617 rotating at the revolving shaft 618; or the driving wheel 617 integrated with the revolving shaft 618, and the driving wheel 617 and the revolving shaft 618 co-operating for rotation; a bearing installed between the revolving shaft 618 and the shell 500;

the driving wheel 615 integrated with the output shaft 3000;

the lockable or releasable mechanism 900 installed between the shell of the gear train 500 and the machine body 600;

the driving wheels 602, 603, 615, 616, and 617 constituted by gears, or friction wheels, or pulleys, or sprockets;

the status of the transmission ratio in the driving wheel set with different rotary direction is for acceleration, deceleration, or constant velocity;

the status of the transmission ratio in the driving wheel set with same rotary direction is for acceleration, deceleration, or constant velocity;

the driving wheel set with same rotary direction constituted by internal gear set or internal friction wheel set;

by way of the above structure, the input shaft 2000 driven at the first rotary direction, through the one-way transmission 301 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 driving the driving wheel 602, and then the driving wheel 602 driving the driving wheel 603 and the driving wheel 616, and then the driving wheel 616 through the driving wheel 617 for further the driving wheel 615, and then the driving wheel 615 driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 38, the lockable or releasable gear train with bidirectional input and one-way output is constituted by integrating with the transmission with different drive rotating direction with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 301, a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 through driving wheel 615, and the one-way transmission 305 installed between the above both;

driving wheel 615 rotating at driving wheel 617 of revolving shaft 618, and then driving the driving wheel 616, the driving wheel 616 and the driving wheel 603 co-integrated with the revolving shaft 604, and a bearing installed between the revolving shaft 604 and the shell of the gear train 500;

the revolving shaft 618 integrated with the shell of the gear train 500, and the driving wheel 617 rotating at the revolving shaft 618; or the driving wheel 617 integrated with the revolving shaft 618, and the driving wheel 617 and the revolving shaft 618 co-operating for rotation; a bearing installed between the revolving shaft 618 and the shell 500;

the driving wheel 603 and the driving wheel 602 integrated for a driving wheel set with different rotary direction;

the driving wheel 602 integrated with the output shaft 3000;

the lockable or releasable mechanism 900 installed between the shell of the gear train 500 and the machine body 600;

the driving wheels 602, 603, 615, 616, and 617 constituted by gears, or friction wheels, or pulleys, or sprockets;

the status of the transmission ratio in the driving wheel set with different rotary direction is for acceleration, deceleration, or constant velocity;

the status of the transmission ratio in the driving wheel set with same rotary direction is for acceleration, deceleration, or constant velocity;

the driving wheel set with same rotary direction constituted by internal gear set or internal friction wheel set;

by way of the above structure, the input shaft 2000 driven at the first rotary direction, through the one-way transmission 301 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 driving the driving wheel 615, and then the driving wheel 615 driving the driving wheel 616 and the driving wheel 603 via the driving wheel 617, and then the driving wheel 603 driving the driving wheel 602, and then the driving wheel 602 driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 39, the lockable or releasable gear train with bidirectional input and one-way output is constituted by integrating with the transmission with different drive rotating direction with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 301, a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 through driving wheel 602, and the one-way transmission 305 installed between the above both;

the driving wheel 602 and the driving wheel 603 with different rotary directions, the driving wheel 603 and the driving wheel 606 co-integrated with the revolving shaft 604, and a bearing installed between the revolving shaft 604 and the shell of the gear train 500;

the driving wheels 602 and 603 constituted by gears or friction wheels;

the driving wheels 605 and 606 constituted by pulleys or sprockets;

the driving wheel 606 and the driving wheel 605 co-integrated with driving belt 607, such as pulley, sprocket, or internal gear, through transmission for constituting a driving wheel set with same rotry direction;

the driving wheel 605 integrated with the output shaft 3000;

the lockable or releasable mechanism 900 installed between the shell of the gear train 500 and the machine body 600;

the status of the transmission ratio in the driving wheel set with different rotary direction is for acceleration, deceleration, or constant velocity;

the status of the transmission ratio in the driving wheel set with same rotary direction is for acceleration, deceleration, or constant velocity;

the driving wheel set with same rotary direction constituted by driving belt, pulley such as toothed belt or steel belt, or sprocket with chain;

by way of the above structure, the input shaft 2000 driven at the first rotary direction, through the one-way transmission 301 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 driving the driving wheel 602, and then the driving wheel 602 driving the driving wheel 603 and the driving wheel 606, and then the driving wheel 606 driving the driving wheel 605, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 40, the lockable or releasable gear train with bidirectional input and one-way output is constituted by integrating with the transmission with different drive rotating direction with the input shaft and the output shaft coaxial fitting, the main components including:

one end of the input shaft 2000 through installed at one side of the shell of the gear train 500 via bearing structure, another end of the input shaft 2000 through the output shaft 3000 via the one-way transmission 301, a bearing installed between the output shaft 3000 and the shell of the gear train 500;

lockable or releasable mechanism 900: related to a mechanism driven to be locked or released by human power, or machine power, or aerodynamic force, or fluid power, or electromagnetic force;

shell of the gear train 500: machine parts installed for constituting the lockable or releasable gear train with bidirectional input and one-way output;

machine body 600: relatively static organization structure;

input shaft 2000 through driving wheel 605, and the one-way transmission 305 installed between the above both;

the driving wheels 602 and 603 constituted by gears or friction wheels;

the driving wheels 605 and 606 constituted by pulleys or sprockets;

the driving wheel 606 and the driving wheel 605 co-integrated with driving belt 607, such as pulley, sprocket, or internal gear, through transmission for constituting a driving wheel set with same rotary direction, the driving wheel 603 and the driving wheel 606 co-integrated with the revolving shaft 604, and a bearing installed between the revolving shaft 604 and the shell of the gear train 500;

the driving wheel 603 and the driving wheel 602 with different rotary directions;

the driving wheel 602 integrated with the output shaft 3000;

the lockable or releasable mechanism 900 installed between the shell of the gear train 500 and the machine body 600;

the status of the transmission ratio in the driving wheel set with different rotary direction is for acceleration, deceleration, or constant velocity;

the status of the transmission ratio in the driving wheel set with same rotary direction is for acceleration, deceleration, or constant velocity;

the driving wheel set with same rotary direction constituted by driving belt, pulley such as toothed belt or steel belt, or sprocket with chain;

by way of the above structure, the input shaft 2000 driven at the first rotary direction, through the one-way transmission 301 for driving the output shaft 3000 to produce the first rotary direction output to constitute the first driving gear train;

by way of the above structure, if the lockable or releasable mechanism 900 is locked, the input shaft 2000 is driven at the second rotary direction, through the one-way transmission 305 driving the driving wheel 605, and then the driving wheel 605 driving the driving wheel 606 and the driving wheel 603, and then the driving wheel 603 driving the driving wheel 602, for driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status As shown in FIG. 41, the lockable or releasable gear train with bidirectional input and one-way output is constituted by integrating with the transmission with different drive rotating direction with the input shaft and the output shaft coaxially integrated in series, the main components including:
- one end of the input shaft 2000 through installed at one side of the shell of the gear train 500 via bearing structure, and through the one-way transmission 302, for integrating with the output shaft 3000 in series; a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 through driving wheel 602, and the one-way transmission 305 installed between the above both;
- the driving wheel 602 and the driving wheel 603 with different rotary directions, the driving wheel 603 and the driving wheel 616 co-integrated with the revolving shaft 604, and a bearing installed between the revolving shaft 604 and the shell of the gear train 500;
- driving wheel 616 rotating at driving wheel 617 of revolving shaft 618, and then driving the driving wheel 615 for constituting driving wheel set with same rotary direction;
- the revolving shaft 618 integrated with the shell of the gear train 500, and the driving wheel 617 rotating at the revolving shaft 618; or the driving wheel 617 integrated with the revolving shaft 618, and the driving wheel 617 and the revolving shaft 618 co-operating for rotation; a bearing installed between the revolving shaft 618 and the shell 500;
- the driving wheel 615 integrated with the output shaft 3000;
- the lockable or releasable mechanism 900 installed between the shell of the gear train 500 and the machine body 600;
- the driving wheels 602, 603, 615, 616, and 617 constituted by gears, or friction wheels, or pulleys or, sprockets;
- the status of the transmission ratio in the driving wheel set with different rotary direction is for acceleration, deceleration, or constant velocity;
- the status of the transmission ratio in the driving wheel set with same rotary direction is for acceleration, deceleration, or constant velocity;
- the driving wheel set with same rotary direction constituted by internal gear set or internal friction wheel set;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the one-way transmission 305 driving the driving wheel 602, and then the driving wheel 602 driving the driving wheel 603 and the driving wheel 616, and then the driving wheel 616 through the driving wheel 617 for further the driving wheel 615, and then the driving wheel 615 driving the output shaft 3000 to produce the first rotary direction output to constitute the second driving gear train; and
- when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

As shown in FIG. 42, the lockable or releasable gear train with bidirectional input and one-way output is constituted by integrating with the transmission with different drive rotating direction with the input shaft and the output shaft coaxially integrated in series, the main components including:
- one end of the input shaft 2000 through installed at one side of the shell of the gear train 500 via bearing structure, and through the one-way transmission 302, for integrating with the output shaft 3000 in series; a bearing installed between the output shaft 3000 and the shell of the gear train 500;
- lockable or releasable mechanism 900: related to a mechanism driven to be locked or released by human power, or machine power, or aerodynamic force, or fluid power, or electromagnetic force;
- shell of the gear train 500: machine parts installed for constituting the lockable or releasable gear train with bidirectional input and one-way output;
- machine body 600: relatively static organization structure;
- input shaft 2000 through driving wheel 615, and the one-way transmission 305 installed between the above both;
- driving wheel 615 rotating at driving wheel 617 of revolving shaft 618, and then driving the driving wheel 616, the driving wheel 616 and the driving wheel 603 co-integrated with the revolving shaft 604, and a bearing installed between the revolving shaft 604 and the shell of the gear train 500;
- the revolving shaft 618 integrated with the shell of the gear train 500, and the driving wheel 617 rotating at the revolving shaft 618; or the driving wheel 617 integrated with the revolving shaft 618, and the driving wheel 617 and the revolving shaft 618 co-operating for rotation; a bearing installed between the revolving shaft 618 and the shell 500;
- the driving wheel 603 and the driving wheel 602 integrated for a driving wheel set with different rotary direction;
- the driving wheel 602 integrated with the output shaft 3000;
- the lockable or releasable mechanism 900 installed between the shell of the gear train 500 and the machine body 600;
- the driving wheels 602, 603, 615, 616, and 617 constituted by gears, or friction wheels, or pulleys or, sprockets;
- the status of the transmission ratio in the driving wheel set with different rotary direction is for acceleration, deceleration, or constant velocity;
- the status of the transmission ratio in the driving wheel set with same rotary direction is for acceleration, deceleration, or constant velocity;
- the driving wheel set with same rotary direction constituted by internal gear set or internal friction wheel set;
- by way of the above structure, the input shaft 2000 driven at the first rotary direction, through the one-way transmission 302 for driving the output shaft 3000 to produce the first rotary direction output to constitute the first driving gear train;
- by way of the above structure, if the lockable or releasable mechanism 900 is locked, the input shaft 2000 is driven at the second rotary direction, through the one-way transmission 305 driving the driving wheel 615, and then the driving wheel 615 driving the driving wheel 616 and the driving wheel 603 via the driving wheel 617, and then the driving wheel 603 driving the driving wheel 602, and then the driving wheel 602 driving the output shaft 3000 to produce the first rotary direction output to constitute the second driving gear train; and when reverse drive caused by back move occurs at the output shaft 3000, through releasing the lockable or releasable mechanism 900, idling produced between the shell of the gear train 500 and the machine body 600, the first driving gear train and the second driving gear train are prevented from lock status.

The invention claimed is:

1. A lockable or releasable gear train with bidirectional input and one-way output, wherein a rotatable shell or rotatable parts of the gear train are locked when the bidirectional input is driven in either of a first rotary direction and a second rotary direction opposite the first rotary direction to drive a first rotary direction output, and wherein the rotatable shell or rotatable parts of the gear trains are released through operation of the lockable or releasable mechanism when the output shaft is driven in a reverse rotary direction by a reverse driving force on the output shaft, to prevent the gear train from becoming jammed, and wherein:

the bidirectional input shaft of the gear train has said first rotary direction and said second rotary direction opposite the first rotary direction;

if the input shaft is driven in the first rotary direction, the first rotary direction output is produced by a first driving gear train driving the output shaft;

if the input shaft is driven in the second rotary direction, the first rotary direction output is produced by the second driving gear train driving the output shaft;

a one-way transmission is installed between the first driving gear train and the second driving gear train to avoid interference from the second driving gear train when the first driving gear train is driven by the input shaft in the first rotary direction to produce the first rotary direction output;

a second one-way transmission is installed between the second driving gear train and the first driving gear train to avoid interference from the first driving gear train when the second driving gear train is driven by the input shaft in the second rotary direction to produce the first rotary direction output;

the lockable or releasable mechanism is installed between the rotatable shell of the gear train and a machine body, or between the fixed shell and rotating parts of the gear train, to prevent the gear train from locking when the output shaft is driven in the second rotary direction by a reverse driving force on the output shaft; and the input shaft is connected to at least one input power source for rotating the input shaft in the first or second rotary directions, said at least one input power source including at least one of a human input power source, a machine input power source, an electric input power source, a fluid input power source, an electric input motor, a hydraulic input motor, and a pneumatic input motor.

2. The lockable or releasable gear train with bidirectional input and one-way output as claimed in claim 1, wherein the lockable or releasable mechanism (900) is installed between the machine body and the rotatable shell of the gear train with bidirectional input and one-way output.

3. The lockable or releasable gear train with bidirectional input and one-way output as claimed in claim 1, wherein the lockable or releasable mechanism (900) is installed between the fixed shell and the rotating parts of the gear train with bidirectional input and one-way output.

4. The lockable or releasable gear train with bidirectional input and one-way output as claimed in claim 1, wherein the input shaft and the output shaft are coaxially installed in series.

5. The lockable or releasable gear train with bidirectional input and one-way output as claimed in claim 1, wherein the input shaft and the output shaft are coaxial.

6. The lockable or releasable gear train with bidirectional input and one-way output as claimed in claim 1, wherein the at least one input power source is a human power source.

7. The lockable or releasable gear train with bidirectional input and one-way output as claimed in claim 1, wherein the at least one input power source is a machine power source.

8. The lockable or releasable gear train with bidirectional input and one-way output as claimed in claim 1, wherein the at least one input power source is a fluid power fluid power source.

9. The lockable or releasable gear train with bidirectional input and one-way output as claimed in claim 1, wherein the at least one input power source includes a source of electric power.

10. The lockable or releasable gear train with bidirectional input and one-way output as claimed in claim 1, wherein the gear train with bidirectional input and one-way output is constituted by a planetary gear train.

11. The lockable or releasable gear train with bidirectional input and one-way output as claimed in claim 10, wherein the input shaft and the output shaft are coaxially installed in series, and further wherein:

one end of the input shaft (2000) is installed at one side of the shell (500) via a bearing structure, another end of the input shaft (2000) and an output shaft (3000) are coaxially installed in series via a one-way transmission (302), and a bearing is installed between the output shaft (3000) and the shell (500);

the input shaft (2000) is integrated with a sun wheel (102);

a planetary wheel (103) is installed between the outer wheel (104) and the sun wheel (102); a center of the planetary wheel (103) rotating about a planetary wheel shaft (201), and one end of the planetary wheel shaft (201) fixed at the shell (500);

the lockable or releasable mechanism (900) is installed between the shell (500) and the machine body (600);

the second one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked, when the input shaft (2000) is driven in the second rotary direction through the sun wheel (102) for further driving the planetary wheel (103) and the outer wheel (104), the ring structure of the outer wheel (104) and the second one-way transmission (301) drive the output shaft (3000) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

12. The lockable or releasable gear train with bidirectional input and one-way output as claimed in claim 10, he planetary gear train with the input shaft and the output shaft coaxially installed in series, and further wherein:

one end of the input shaft (2000) is installed at one side of the shell (500) via bearing structure, another end of the input shaft (2000) and the output shaft (3000) are coaxially installed in series via the first one-way transmission (302), and a bearing is installed between the output shaft (3000) and the shell (500);

the input shaft (2000) is coupled with a sun wheel (102) through a third one-way transmission (305);

a planetary wheel (103) is installed between an outer wheel (104) and the sun wheel (102); a center of the planetary wheel (103) rotating about a planetary wheel shaft (201), and one end of the planetary wheel shaft (201) fixed to the shell (500);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio for acceleration, deceleration, or constant velocity;

the outer wheel (104) is driven by the planetary wheel (103), with a transmission ratio for acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the third one-way transmission (305) drives the sun wheel (102), the planetary wheel (103), and the outer wheel (104), and through the ring structure of the outer wheel (104) and the second one-way transmission (301), drives the output shaft (3000) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

13. The lockable or releasable gear train with bidirectional input and one-way output as claimed in claim 10, wherein the input shaft and the output shaft are coaxially installed in series, and further wherein:

one end of the input shaft (2000) is installed at one side of the shell (500) via a rotational structure of a planetary wheel support arm ring frame (200) and the second one-way transmission (303), another end of the input shaft (2000) and the output shaft (3000) are coaxially installed in series via the first one-way transmission (302), and a bearing is installed between the output shaft (3000) and the shell (500);

input shaft (2000) is integrated with a sun wheel (102);

a planetary wheel (103) is installed between the outer wheel (104) and the sun wheel (102); a center of the planetary wheel (103) rotating about a planetary wheel shaft (201), one end of the planetary wheel shaft (201) integrated with the planetary wheel support arm ring frame (200), and the planetary wheel support arm ring frame (200) rotating between the input shaft (2000) and the one-way transmission (303);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, the input shaft (2000) driven at the first rotary direction, through the one-way transmission (302) for driving the output shaft (3000) to produce the first rotary direction output to constitute the first driving gear train;

by way of the above structure, if the lockable or releasable mechanism (900) is locked, the input shaft (2000) is driven at the second rotary direction, through the sun wheel (102) for further driving the planetary wheel (103) and the outer wheel (104), and through the ring structure of the outer wheel (104) and the one-way transmission (301), for driving the output shaft (3000) to produce the first rotary direction output to constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

14. The lockable or releasable gear train with bidirectional input and one-way output as claimed in claim 10, wherein the input shaft and the output shaft are coaxially installed in series, and further wherein:

one end of the input shaft (2000) through installed at one side of the shell (500), another end of the input shaft (2000) and the output shaft (3000) are coaxially installed in series via the one-way transmission (302), and a bearing installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of the planetary wheel shaft (201) integrated with the planetary wheel support arm ring frame (200), and the planetary wheel support arm ring frame (200) rotating at the input shaft (2000) between the shell (500) and the sun wheel (102) via the one-way transmission (303);

the lockable or releasable mechanism (900) is installed between the shell (500) and the machine body (600);

the one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction for driving the sun wheel (102) and for further driving the planetary wheel (103) and the outer wheel (104), the output shaft (3000) is driven through the ring structure of the outer wheel (104) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

15. The lockable or releasable gear train with bidirectional input and one-way output as claimed in claim 10, wherein the input shaft and the output shaft coaxially installed in series, further wherein:

one end of the input shaft (2000) is installed at one side of the shell (500) via bearing structure, another end of the input shaft (2000) and the output shaft (3000) are coaxially installed in series via the one-way transmission (302), and a bearing installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), the planetary wheel shaft (201) is integrated with a planetary wheel support arm ring frame (200), and the planetary wheel support arm ring frame (200) rotates about the input shaft (2000) between the first one-way transmission (302) and the sun wheel (102) via a one-way transmission (303);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) drives the planetary wheel (103) and the outer wheel (104), and the output shaft 3000) is driven through the ring structure of the outer wheel (104) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

16. The lockable or releasable gear train with bidirectional input and one-way output as claimed in claim 10, wherein the planetary gear train with the input shaft and the output shaft coaxially installed in series, and further wherein:

one end of the input shaft (2000) is installed at one side of the shell (500) via bearing structure, another end of the input shaft (2000) and the output shaft (3000) are coaxially installed in series via the one-way transmission (302), and a bearing installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the input shaft (2000) between the second one-way transmission (301) and the first one-way transmission (302) via a third one-way transmission (303);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, when the input shaft (2000) is driven at the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) drives the planetary wheel (103) and the outer wheel (104), and the output shaft (3000) is driven through the ring structure of the outer wheel (104) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

17. The lockable or releasable gear train with bidirectional input and one-way output as claimed in claim 10, wherein the input shaft and the output shaft coaxially installed in series, and further wherein:

one end of the input shaft (2000) is installed at one side of the shell (500) via bearing structure, another end of the input shaft (2000) and the output shaft (3000) are coaxially installed in series via the one-way transmission (302), and a bearing installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about a ring structure of the outer wheel (104) surrounding the second one-way transmission (301) via a third one-way transmission (303), and the second one-way transmission (301) rotates about the output shaft (3000);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, when the input shaft (2000) is driven in the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) drives the planetary wheel (103) and the outer wheel (104), and the output shaft (3000) is driven through the ring structure of the outer wheel (104) and the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

18. The lockable or releasable gear train with bidirectional input and one-way output as claimed in claim 10, wherein the input shaft and the output shaft are coaxial, and further wherein:

one end of the input shaft (2000) is installed at one side of the shell (500) via a bearing structure, another end of the input shaft (2000) is coupled to the output shaft (3000) via the one-way transmission (302), and a bearing is installed between the output shaft (3000) and the shell (500);

input shaft (2000) is integrated with a sun wheel (102);

the planetary wheel (103) installed between the outer wheel (104) and the sun wheel (102); the center of the planetary wheel (103) rotating at the planetary wheel shaft (201), one end of the planetary wheel shaft (201) fixed at the shell (500);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the one-way transmission (302) drives the output shaft (3000) to produce a first rotary direction output and constitute the first driving gear train;

by way of the above structure, when the lockable or releasable mechanism (900) is locked and the input shaft (2000) is driven in the second rotary direction, the sun wheel (102) drives the planetary wheel (103) and the outer wheel (104), and the output shaft (3000) is driven through the ring structure of the outer wheel (104) and the one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

19. The lockable or releasable gear train with bidirectional input and one-way output as claimed in claim 10, wherein the input shaft and the output shaft are coaxial, and further wherein:

one end of the input shaft (2000) is installed at one side of the shell (500) via a bearing structure, another end of the input shaft (2000) is coupled to the output shaft (3000) through the first one-way transmission (302) and the planetary wheel support arm ring frame (200), which are coaxial, and the second one-way transmission (301), and a bearing is installed between the output shaft (3000) and the shell (500);

the input shaft (2000) is coupled to the sun wheel (102) through a third one-way transmission (305);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates between the second one-way transmission (301) and the first one-way transmission (302);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the output shaft (3000) is driven through the first one-way transmission (302), the planetary wheel support arm ring frame (200), and the second one-way transmission (301) to produce the first rotary direction output and constitute the first driving gear train;

by way of the above structure, when the lockable or releasable mechanism (900) is locked and the input shaft (2000) is driven in the second rotary direction, the third one-way transmission (305) and the sun wheel (102) further drive the planetary wheel (103) and the outer wheel (104), and the output shaft (3000) is driven through the ring structure of the outer wheel (104) to produce a first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

20. The lockable or releasable gear train with bidirectional input and one-way output as claimed in claim 10, wherein the input shaft and the output shaft are coaxial, and further wherein:

one end of the input shaft (2000) is installed at one side of the shell (500) via a rotational structure of the planetary wheel support arm ring frame (200) and a third one-way transmission (303), another end of the input shaft (2000) is coupled to the output shaft (3000) via the first one-way transmission (302), and a bearing is installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates between the input shaft (2000) and the one-way transmission (303);

the lockable or releasable mechanism (900) is installed between the shell (500) and the machine body (600);

the one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, when the input shaft (2000) is driven in the first rotary direction, the output shaft (3000) is driven through the first one-way transmission (302) to produce the first rotary direction output and constitute the first driving gear train;

by way of the above structure when the lockable or releasable mechanism (900) is locked and the input shaft (2000) is driven in the second rotary direction, the sun wheel (102) further drives the planetary wheel (103) and the outer wheel (104), and the output shaft (3000) is driven through a ring structure of the outer wheel (104) and the second one-way transmission (301) to produce a first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

21. The lockable or releasable gear train with bidirectional input and one-way output as claimed in claim 10, wherein the input shaft and the output shaft are coaxial, further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the input shaft (2000) between the sun wheel (102) and the shell (500) via a one-way transmission (303);

the lockable or releasable mechanism (900) is installed between the shell (500) and the machine body (600);

the second one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) further drives the planetary wheel (103) and the outer wheel (104), and the output shaft (3000) is driven through the ring structure of the outer wheel (104) and the one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

22. The lockable or releasable gear train with bidirectional input and one-way output as claimed in claim 10, wherein the input shaft and the output shaft are coaxial, further wherein:

one end of the input shaft (2000) is installed at one side of the shell (500), another end of the input shaft (2000) is coupled to the output shaft (3000) via the first one-way transmission (302), and a bearing is installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the input shaft (2000) between the sun wheel (102) and the first one-way transmission (302) via a third one-way transmission (303);

the lockable or releasable mechanism (900) is installed between the shell (500) and the machine body (600);

the one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the output shaft (3000) is driven through the first one-way transmission (302) to produce the first rotary direction output and constitute the first driving gear train;

by way of the above structure, when the lockable or releasable mechanism (900) is locked and the input shaft (2000) is driven in the second rotary direction, through the sun wheel (102) for further driving the planetary wheel (103) and the outer wheel (104), and through the ring structure of the outer wheel (104) and the one-way transmission (301), for driving the output shaft (3000) to produce the first rotary direction output to constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

23. The lockable or releasable gear train with bidirectional input and one-way output as claimed in claim 10, wherein the input shaft and the output shaft are coaxial, further wherein:

one end of the input shaft (2000) is installed at one side of the shell (500), another end of the input shaft (2000) is coupled to the output shaft (3000) via the first one-way transmission (302), and a bearing is installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the output shaft (3000) via a one-way transmission (303);

the lockable or releasable mechanism (900) is installed between the shell (500) and the machine body (600);

the one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, when the input shaft (2000) is driven in the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) further drives the planetary wheel (103) and the outer wheel (104), and the output shaft (3000) is driven through the ring structure of the outer wheel (104) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

24. The lockable or releasable gear train with bidirectional input and one-way output as claimed in claim 10, wherein the input shaft and the output shaft are coaxial, further wherein:

one end of the input shaft (2000) is installed at one side of the shell (500), another end of the input shaft (2000) through the output shaft (3000) via the one-way transmission (302), and a bearing installed between the output shaft (3000) and the shell (500);

input shaft (2000) is integrated with a sun wheel (102);

the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the ring structure of the outer wheel (104) via a third one-way transmission (303);

the lockable or releasable mechanism (900) is installed between the shell (500) and the machine body (600);

the one-way transmission (301) is installed between a ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the one-way transmission (302), drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) further drives the planetary wheel (103) and the outer wheel (104), and the output shaft (3000) is driven through the ring structure of the outer wheel (104) and the one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

25. The lockable or releasable gear train with bidirectional input and one-way output as claimed in claim 10, wherein:
one end of the input shaft (2000) is installed at one side of the shell (500) via bearing structure, another end of the input shaft (2000) and the output shaft (3000) are coaxially installed in series via the one-way transmission (302), and a bearing installed between the output shaft (3000) and the shell (500);
input shaft (2000) is integrated with a sun wheel (102);
the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the input shaft (2000) installed between the sun wheel (102) and the shell (500) via a third one-way transmission (303), and the lockable or releasable mechanism (900) is installed between the planetary wheel support arm ring frame (200) and the shell (500);
the shell (500) is fixed in the machine body (600);
the one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) driven by the sun wheel (102) with a transmission ratio that provides acceleration, deceleration, or constant velocity;

the outer wheel (104) driven by the planetary wheel (103) with a transmission ratio that provides acceleration, deceleration, or constant velocity;

by way of the above structure, when the input shaft (2000) is driven in the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the sun wheel (102) for further driving the planetary wheel (103) and the outer wheel (104), and the output shaft (3000) is driven through the ring structure of the outer wheel (104) and the one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the planetary wheel support arm ring frame (200), preventing locking of the first driving gear train and the second driving gear train.

26. The lockable or releasable gear train with bidirectional input and one-way output as claimed in claim 10, wherein:
one end of the input shaft (2000) is installed at one side of the shell (500) via a bearing structure, another end of the input shaft (2000) and the output shaft (3000) are coaxially installed in series via the one-way transmission (302), and a bearing is installed between the output shaft (3000) and the shell (500);
the input shaft (2000) is coupled to the sun wheel (102) through a third one-way transmission (305);
the planetary wheel (103) is installed between the outer wheel (104) and the sun wheel (102); a center of the planetary wheel (103) rotating about the planetary wheel shaft (201), one end of a planetary wheel shaft (201) is integrated with the planetary wheel support arm ring frame (200), and the planetary wheel support arm ring frame (200) rotates about the input shaft (2000) and is installed between a fourth one-way transmission (305) and the shell (500) via a third one-way transmission (303), and the lockable or releasable mechanism (900) is installed between the planetary wheel support arm ring frame (200) and the shell (500);
the one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the fourth one-way transmission (305) drives the sun wheel (102), and further drives the planetary wheel (103) and the outer wheel (104), and the output shaft (3000) is driven through the ring structure of the outer wheel (104) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the planetary wheel support arm ring frame (200), preventing locking of the first driving gear train and the second driving gear train.

27. The lockable or releasable gear train with bidirectional input and one-way output as claimed in claim 10, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

the second one-way transmission (301) is installed between the ring structure of the outer wheel (104) and the output shaft (3000);

the sun wheel (102), the planetary wheel (103), and the outer wheel (104) are constituted by gears or friction wheels;

the planetary wheel (103) is driven by the sun wheel (102) with a transmission ratio that provides acceleration, deceleration, or constant velocity;

the outer wheel (104) is driven by the planetary wheel (103) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the sun wheel (102) further drives the planetary wheel (103) and the outer wheel (104), and the output shaft (3000) is driven through the ring structure of the outer wheel (104) and the one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the planetary wheel support arm ring frame (200), preventing locking of the first driving gear train and the second driving gear train.

28. The lockable or releasable gear train with bidirectional input and one-way output as claimed in claim 1, wherein the gear train with bidirectional input and one-way output is constituted by an epicyclic gear train.

29. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); the center of the epicyclic gear (403) rotating at an epicyclic gear shaft (401); and one end of the epicyclic gear shaft (401) fixed at the shell (500);

the lockable or releasable mechanism (900) is installed between the shell (500) and the machine body (600);

the one-way transmission (301) is installed between the outward oblique wheel (404) and the output shaft (3000);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) driven in the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the inward oblique wheel (402) further drives the epicyclic gear (403) and the outward oblique wheel (404), and the output shaft (3000) is driven through the outward oblique wheel (404) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

30. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the first one-way transmission (302), and a bearing is installed between the output shaft (3000) and the shell (500);

the input shaft (2000) is coupled to an inward oblique wheel (402) through a third one-way transmission (305);

an epicyclic gear (403) is installed between an outward oblique wheel (404) and the inward oblique wheel (402); the center of the epicyclic gear (403) rotating at the epicyclic gear shaft (401), and one end of the epicyclic gear shaft (401) fixed at the shell (500);

the lockable or releasable mechanism (900) is installed between the shell (500) and the machine body (600);

the second one-way transmission (301) is installed between the outward oblique wheel (404) and the output shaft (3000);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the third one-way transmission (305) drives the inward oblique wheel (402), the epicyclic gear (403), and the outward oblique wheel (404), and the output shaft is driven through the outward oblique wheel (404) and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

31. The lockable or releasable gear train with bidirectional input and one-way output as claimed in claim 28, wherein the input shaft and the output shaft are coaxially installed in series, and further wherein:

one end of the input shaft (2000) is installed at an epicyclic gear support arm ring frame (400) via a bearing structure, the epicyclic gear support arm ring frame (400) are integrated with one side of the shell (500) via a third one-way transmission (303), another end of the input shaft (2000) and the output shaft (3000) are coaxially installed in series via the first one-way transmission (302), and a bearing is installed between the output shaft (3000) and the shell (500);

input shaft (2000) integrated with inward oblique wheel (402);

an epicyclic gear (403) is installed between an outward oblique wheel (404) and the inward oblique wheel (402); a center of the epicyclic gear (403) rotating at the epicyclic gear shaft (401), one end of the epicyclic gear shaft (401) being integrated with an epicyclic gear support arm ring frame (400) and rotating between the input shaft (2000) and the third one-way transmission (303);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the input shaft (2000) drives the inward oblique wheel (402), the epicyclic gear (403), and the outward oblique wheel (404), and the output shaft (3000) is driven through the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

32. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at the epicyclic gear shaft (401), one end of the epicyclic gear shaft (401) integrated with an epicyclic gear support arm ring frame (400), and the epicyclic gear support arm ring frame (400) rotating at the input shaft (2000) between the shell (500) and the inward oblique wheel (402) via a third one-way transmission (303);

the lockable or releasable mechanism (900) is installed between the shell (500) and the machine body (600);

the outward oblique wheel (404) surrounds and is coupled to the output shaft (3000) via the one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the second one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

33. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with an epicyclic gear support arm ring frame (400) installed between the inward oblique wheel (402) and the one-way first transmission (302), and a third one-way transmission (303) is installed between the epicyclic gear support arm ring frame (400) and the input shaft (2000);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

34. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with a epicyclic gear support arm ring frame (400) installed at the output shaft (3000), and a third one-way transmission (303) installed between the epicyclic gear support arm ring frame (400) and the output shaft (3000);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the one-way transmission (302) drives the output shaft (3000) to produce the first rotary direction output and constitute the first driving gear train;

by way of the above structure, when the lockable or releasable mechanism (900) is locked, and the input shaft (2000) is driven at the second rotary direction, the output shaft (3000) is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

35. The lockable or releasable gear train with bidirectional input and one-way output as claimed in claim 28, wherein the input shaft and the output shaft are coaxially installed in series, further wherein:

one end of the input shaft (2000) is installed at one side of the shell (500) via a bearing structure, another end of the input shaft (2000) and the output shaft (3000) are coaxially installed in series via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with an epicyclic gear support arm ring frame (400), and a third one-way transmission (303) installed between the epicyclic gear support arm ring frame (400) and the outward oblique wheel (404);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the second one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

36. The lockable or releasable gear train with bidirectional input and one-way output as claimed in claim 28, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), one end of the epicyclic gear shaft (401) integrated with an epicyclic gear support arm ring frame (400), the epicyclic gear support arm ring frame (400) fixed at the shell (500);

the lockable or releasable mechanism (900) is installed between the shell (500) and the machine body (600);

the second one-way transmission (301) is installed between the outward oblique wheel (404) and the output shaft (3000);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), the outward oblique wheel (404), and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

37. The lockable or releasable gear train with bidirectional input and one-way output as claimed in claim 28, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (302), an epicyclic gear support arm ring frame (400) and the second one-way transmission (301), and a bearing is installed between the output shaft (3000) and the shell (500);

the input shaft (2000) is coupled to an inward oblique wheel (402) a third one-way transmission (305);

an epicyclic gear (403) is installed between an outward oblique wheel (404) and the inward oblique wheel (402); a center of the epicyclic gear (403) rotating at an epicyclic gear shaft (401), the epicyclic gear shaft (401) installed at the epicyclic gear support arm ring frame (400), and the epicyclic gear support arm ring frame (400) coaxially installed between the second one-way transmission (301) and the first one-way transmission (302);

the lockable or releasable mechanism (900) is installed between the shell (500) and the machine body (600);

the one-way transmission (301) installed between the outward oblique wheel (404) and the epicyclic gear support arm ring frame (400);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) and the second one-way transmission (301) drive the output shaft (3000) to produce the first rotary direction output and constitute the first driving gear train;

by way of the above structure, when the lockable or releasable mechanism (900) is locked and the input shaft (2000) is driven in the second rotary direction, and the output shaft (3000) is driven through the third one-way transmission (305), the epicyclic gear (403), and the outward oblique wheel (404) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

38. The lockable or releasable gear train with bidirectional input and one-way output as claimed in claim 28, wherein the input shaft and the output shaft are coaxial, and further wherein:

one end of the input shaft (2000) is installed at an epicyclic gear support arm ring frame (400) via a bearing structure, the epicyclic gear support arm ring frame (400) is integrated with one side of the shell (500) via a third one-way transmission (303), another end of the input shaft (2000) is coupled to the output shaft (3000) via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with the epicyclic gear support arm ring frame (400), and the epicyclic gear support arm ring frame (400) rotating between the input shaft (2000) and the third one-way transmission (303);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the second one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

39. The lockable or releasable gear train with bidirectional input and one-way output as claimed in claim 28, wherein the input shaft and the output shaft are coaxial, further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with an epicyclic gear support arm ring frame (400) near the shell (500), and a third one-way transmission (303) is installed between the epicyclic gear support arm ring frame (400) and the input shaft (2000);

the lockable or releasable mechanism (900) is installed between the shell (500) and the machine body (600);

an outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

40. The lockable or releasable gear train with bidirectional input and one-way output as claimed in claim 28, wherein the input shaft and the output shaft are coaxial, and further wherein:

one end of the input shaft (2000) is installed at one side of the shell (500) via a bearing structure, another end of the input shaft (2000) is coupled to the output shaft (3000)

via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with an epicyclic gear support arm ring frame (400) installed between the inward oblique wheel (402) and the first one-way transmission (302), and a third one-way transmission (303) is installed between the epicyclic gear support arm ring frame (400) and the input shaft (2000);

the lockable or releasable mechanism (900) is installed between the shell (500) and the machine body (600);

the outward oblique wheel (404) surrounds and is coupled to the output shaft (3000) via the one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and input shaft (2000) is driven in the second rotary direction, the output shaft (3000) is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

41. The lockable or releasable gear train with bidirectional input and one-way output as claimed in claim 28, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with a epicyclic gear support arm ring frame (400) installed at the output shaft (3000), and a third one-way transmission (303) installed between the epicyclic gear support arm ring frame (400) and the output shaft (3000);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

42. The lockable or releasable gear train with bidirectional input and one-way output as claimed in claim 28, wherein the input shaft and the output shaft are coaxial and further wherein:

one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), the epicyclic gear shaft (401) integrated with an epicyclic gear support arm ring frame (400), and a third one-way transmission (303) is installed between the epicyclic gear support arm ring frame (400) and the outward oblique wheel (404);

the lockable or releasable mechanism (900) is installed between the shell (500) and the machine body (600);

the outward oblique wheel (404) surrounds and is coupled to the output shaft (3000) via the second one-way transmission (301);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft is driven through the inward oblique wheel (402), the epicyclic gear (403), and the outward oblique wheel (404), and then through the one-way transmission (301), to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

43. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the one-way transmission (302), and a bearing is installed between the output shaft (3000) and the shell (500);

the input shaft (2000) is integrated with an inward oblique wheel (402);

an epicyclic gear (403) is installed between an outward oblique wheel (404) and the inward oblique wheel (402); a center of the epicyclic gear (403) rotating at an epicyclic gear shaft (401), one end of the epicyclic gear shaft (401) integrated with an epicyclic gear support arm ring frame (400), and the epicyclic gear support arm ring frame (400) is coupled to the input shaft (2000) through a third one-way transmission (303) installed between the first one-way transmission (302) and the inward oblique wheel (402);

the lockable or releasable mechanism (900) is installed between the epicyclic gear support arm ring frame (400) and the shell (500);

the shell (500) is fixed at the machine body (600);

the second one-way transmission (301) is installed between the outward oblique wheel (404) and the output shaft (3000);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the inward oblique wheel (402), the epicyclic gear (403), the outward oblique wheel (404), the outward oblique wheel (404), and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the epicyclic gear support arm ring frame (400), preventing locking of the first driving gear train and the second driving gear train.

44. The lockable or releasable gear train with bidirectional input and one-way output as claimed in claim 28, wherein the input shaft and the output shaft are coaxially installed in series, and further wherein:

one end of the input shaft (2000) is installed at one side of the shell (500) via a bearing structure, another end of the input shaft (2000) and the output shaft (3000) are coaxially installed in series via the first one-way transmission (302), and a bearing is installed between the output shaft (3000) and the shell (500);

the input shaft (2000) is coupled to an inward oblique wheel (402) through a third one-way transmission (305);

an epicyclic gear (403) is installed between an outward oblique wheel (404) and the inward oblique wheel (402); a center of the epicyclic gear (403) rotating at an epicyclic gear shaft (401), one end of the epicyclic gear shaft (401) integrated with an epicyclic gear support arm ring frame (400), and the epicyclic gear support arm ring frame (400) being coupled to the input shaft (2000) through a fourth one-way transmission (303) positioned between the first one-way transmission (302) and the third one-way transmission (305);

the lockable or releasable mechanism (900) is installed between the epicyclic gear support arm ring frame (400) and the shell (500);

the shell (500) is fixed at the machine body (600);

the second one-way transmission (301) is installed between the outward oblique wheel (404) and the output shaft (3000);

the inward oblique wheel (402), the epicyclic gear (403), and the outward oblique wheel (404) are constituted by gears or friction wheels;

the epicyclic gear (403) is driven by the inward oblique wheel (402) with a transmission ratio that provides acceleration, deceleration, or constant velocity;

the outward oblique wheel (404) is driven by the epicyclic gear (403) with a transmission ratio that provides acceleration, deceleration, or constant velocity;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the third one-way transmission (305), the inward oblique wheel (402), the epicyclic gear (403), the outward oblique wheel (404), the outward oblique wheel (404), and the second one-way transmission (301) to produce the first rotary direction output and constitute the second driving gear train; and when a reverse drive caused by a backwards move occurs at the output shaft (3000), the lockable or releasable mechanism (900) is released, resulting in idling between the shell (500) and the epicyclic gear support arm ring frame (400), preventing locking of the first driving gear train and the second driving gear train.

45. The lockable or releasable gear train with bidirectional input and one-way output as claimed in claim 28, wherein the input shaft and the output shaft are coaxial, and further wherein:
- one end of the input shaft (2000) is installed at one side of the shell (500) via a bearing structure, another end of the input shaft (2000) is coupled to the output shaft (3000) via the first one-way transmission (302), and a bearing is installed between the output shaft (3000) and the shell (500);
- the input shaft (2000) is integrated with an inward oblique wheel (402);
- an epicyclic gear (403) is installed between an outward oblique wheel (404) and the inward oblique wheel (402); a center of the epicyclic gear (403) rotating at an epicyclic gear shaft (401), one end of the epicyclic gear shaft (401) integrated with an epicyclic gear support arm ring frame (400), and the epicyclic gear support arm ring frame (400) being coupled to the input shaft (2000) through a third one-way transmission (303) positioned between the inward oblique wheel (402) and the first one-way transmission (302);
- the lockable or releasable mechanism (900) is installed between the epicyclic gear support arm ring frame (400) and the shell (500);
- the shell (500) is fixed at the machine body (600);
- the second one-way transmission (301) is installed between the outward oblique wheel (404) and the output shaft (3000);
- the inward oblique wheel (402), the epicyclic gear (403), and the outward oblique wheel (404) are constituted by gears or friction wheels;
- the epicyclic gear (403) is driven by the inward oblique wheel (402) with a transmission ratio that provides acceleration, deceleration, or constant velocity;
- the outward oblique wheel (404) is driven by the epicyclic gear (403) with a transmission ratio that provides acceleration, deceleration, or constant velocity;
- by way of the above structure, when the input shaft (2000) is driven in the first rotary direction, the first one-way transmission (302) drives the output shaft (3000) to produce the first rotary direction output and constitute the first driving gear train;
- by way of the above structure, when the lockable or releasable mechanism (900) is locked and the input shaft (2000) is driven in the second rotary direction, the output shaft (3000) is driven through the inward oblique wheel (402), the epicyclic gear (403), the outward oblique wheel (404), the outward oblique wheel (404) and the second none-way transmission (301) to produce the first rotary direction output and constitute the second driving gear train; and
- when a reverse drive caused by a backwards move occurs at the output shaft (3000), the lockable or releasable mechanism (900) is released, resulting in idling between the shell (500) and the epicyclic gear support arm ring frame (400), preventing locking of the first driving gear train and the second driving gear train.

46. The lockable or releasable gear train with bidirectional input and one-way output as claimed in claim 1, wherein the gear train with bidirectional input and one-way output is constituted by integrated transmissions with different transmission rotary directions.

47. The lockable or releasable gear train with bidirectional input and one-way output as claimed in claim 46, wherein the input shaft and the output shaft are coaxial, and further wherein:
- one end of the input shaft (2000) is installed at one side of the shell (500) via a bearing structure, another end of the input shaft (2000) is coupled to the output shaft (3000) via the first one-way transmission (301), a bearing is installed between the output shaft (3000) and the shell (500);
- the input shaft (2000) is coupled to a first driving wheel (602) through the second one-way transmission (305);
- a rotary direction of the first driving wheel (602) is different from that of a second driving wheel (603), the second driving wheel (603) and a third driving wheel (616) is integrated with a first revolving shaft (604), and a bearing is installed between the revolving shaft (604) and the shell (500);
- the third driving wheel (616) is coupled to a fourth driving wheel (617) rotatable about or integrated with a second revolving shaft (618), and then drives a fifth driving wheel (615) to constitute a driving wheel set with a same rotary direction;
- the second revolving shaft (618) is integrated with the shell (500), and a bearing is installed between the second revolving shaft (618) and the shell (500);
- the fifth driving wheel (615) is integrated with the output shaft (3000);
- the lockable or releasable mechanism (900) is installed between the shell (500) and the machine body (600);
- the first, second, fifth, third, and fourth driving wheels (602), (603), (615), (616), and (617) are constituted by gears, friction wheels, pulleys, or sprockets;
- a transmission ratio of the driving wheel set with different rotary directions provides acceleration, deceleration, or constant velocity;
- a transmission ratio of the driving wheel set with same rotary directions provides acceleration, deceleration, or constant velocity;
- the driving wheel set with same rotary direction constituted by internal gear set or internal friction wheel set;
- by way of the above structure, when the input shaft (2000) is driven at the first rotary direction, the first one-way transmission (301) drives the output shaft (3000) to produce the first rotary direction output and constitute the first driving gear train;
- by way of the above structure, when the lockable or releasable mechanism (900) is locked and the input shaft (2000) is driven in the second rotary direction, the output shaft (3000) is driven through the second one-way transmission (305), the first driving wheel (602), the second driving wheel (603), the third driving wheel (616), the fourth driving wheel (617) and the fifth driving wheel (615) to produce the first rotary direction output and constitute the second driving gear train; and
- when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

48. The lockable or releasable gear train with bidirectional input and one-way output as claimed in claim 46, wherein the input shaft and the output shaft are coaxial, further wherein:
- one end of the input shaft (2000) is installed at one side of the shell (500) via a bearing structure, another end of the input shaft (2000) is coupled to the output shaft (3000)

via the first one-way transmission (301), and a bearing is installed between the output shaft (3000) and the shell (500);

the input shaft (2000) is coupled to a first driving wheel (615) through the second one-way transmission (305);

the first driving wheel (615) is coupled to a second driving wheel (617) rotatable about or integrated with a first revolving shaft (618), which is coupled to a third driving wheel (616), the third driving wheel (616) and a fourth driving wheel (603) being integrated with a second revolving shaft (604), and a bearing being installed between the second revolving shaft (604) and the shell (500);

the revolving shaft (618) is integrated with the shell (500), and a bearing is installed between the first revolving shaft (618) and the shell (500);

the fourth driving wheel (603) and a fifth driving wheel (602) are integrated to form a driving wheel set with different rotary directions;

the fifth driving wheel (602) is integrated with the output shaft (3000);

the lockable or releasable mechanism (900) is installed between the shell (500) and the machine body (600);

the fifth, fourth, first, third, and second driving wheels (602), (603), (615), (616), and (617) are constituted by gears, friction wheels, pulleys, or sprockets;

a transmission ratio of the driving wheel set with different rotary directions provides acceleration, deceleration, or constant velocity;

a transmission ratio of the driving wheel set with same rotary directions provides acceleration, deceleration, or constant velocity;

the driving wheel set with same rotary directions is constituted by an internal gear set or internal friction wheel set;

by way of the above structure, when the input shaft (2000) is driven in the first rotary direction, the first one-way transmission (301) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the second one-way transmission (305), first driving wheel (615), the second driving wheel (616), the fourth driving wheel (603) via the third driving wheel (617), and the fifth driving wheel (602) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

49. The lockable or releasable gear train with bidirectional input and one-way output as claimed in claim 46, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (301), and a bearing is installed between the output shaft (3000) and the shell (500);

the input shaft (2000) is coupled to a first driving wheel (602) via the second one-way transmission (305);

the first driving wheel (602) is coupled to a second driving wheel (603) to form a driving wheel set having different rotary directions, the second driving wheel (603) and a third driving wheel (606) being integrated with a revolving shaft (604), and a bearing being installed between the revolving shaft (604) and the shell (500);

the first and second driving wheels (602) and (603) are constituted by gears or friction wheels;

a fourth driving wheel (605) and the third driving wheel (606) coupled therewith are constituted by pulleys or sprockets;

the third driving wheel (606) and fourth the driving wheel (605) are integrated with a driving belt, chain, or internal gear 607, to form a transmission driving wheel set with a same rotary direction;

the fourth driving wheel (605) is integrated with the output shaft (3000);

the lockable or releasable mechanism (900) is installed between the shell (500) and the machine body (600);

a transmission ratio of the driving wheel set with different rotary directions provides acceleration, deceleration, or constant velocity;

a transmission ratio of the driving wheel set with same rotary direction provides acceleration, deceleration, or constant velocity;

by way of the above structure, when the input shaft (2000) is driven in the first rotary direction, the first one-way transmission (301) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the second one-way transmission (305), the first driving wheel (602), the second driving wheel (603), the third driving wheel (606), and the fourth driving wheel (605) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

50. The lockable or releasable gear train with bidirectional input and one-way output as claimed in claim 46, wherein the input shaft and the output shaft are coaxial, and further wherein:

one end of the input shaft (2000) is installed at one side of the shell (500) via a bearing structure, another end of the input shaft (2000) is coupled to the output shaft (3000) via the first one-way transmission (301), and a bearing is installed between the output shaft (3000) and the shell (500);

the input shaft (2000) is coupled to a first driving wheel (605) through the second one-way transmission (305);

the first driving wheel (602) and a second driving wheel (603) coupled to the first driving wheel are constituted by gears or friction wheels;

a third driving wheel (605) and a fourth driving wheel (606) are constituted by pulleys or sprockets;

the fourth driving wheel (606) and the third driving wheel (605) are integrated with a driving belt, chain, or internal gear 607 to form a transmission constituting a driving wheel set with same rotary direction, a second driving wheel (603) and the fourth driving wheel (606) being integrated with a revolving shaft (604), and a bearing being installed between the revolving shaft (604) and the shell (500);

the second driving wheel (603) and a first driving wheel (602) coupled to the fifth driving wheel (603) form a driving wheel set with different rotary directions;

the fifth driving wheel (602) is integrated with the output shaft (3000);

the lockable or releasable mechanism (900) is installed between the shell (500) and the machine body (600);

a transmission ratio of the driving wheel set with different rotary directions provides acceleration, deceleration, or constant velocity;

a transmission ratio of the driving wheel set with same rotary direction provides acceleration, deceleration, or constant velocity;

by way of the above structure, when the input shaft (2000) is driven in the first rotary direction, the second one-way transmission (301) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the third one-way transmission (305), the fourth driving wheel (605), the third driving wheel (606), the second driving wheel (603), and the first driving wheel (602) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

51. The lockable or releasable gear train with bidirectional input and one-way output as claimed in claim 46, wherein the input shaft and the output shaft are coaxially integrated in series, further wherein:

one end of the input shaft (2000) is installed at one side of the shell (500) via a bearing structure, the input shaft (2000) being coupled in series with the output shaft (3000) by the first one-way transmission (302), and a bearing is installed between the output shaft (3000) and the shell (500);

the input shaft (2000) is coupled to a first driving wheel (602) through the second one-way transmission (305);

the first driving wheel (602) is coupled to a second driving wheel (603) to form a driving wheel set with different rotary directions, the second driving wheel (603) and a third driving wheel (616) being integrated with a first revolving shaft (604), and a bearing being installed between the first revolving shaft (604) and the shell (500);

the third driving wheel (616) being coupled to a fourth driving wheel (617) rotatable about or integrated with a second revolving shaft (618), and the fourth driving wheel (617) being coupled with a fifth driving wheel (615) to form a driving wheel set with a same rotary direction;

the second revolving shaft (618) is integrated with the shell (500), and a bearing is installed between the second revolving shaft (618) and the shell (500);

the fifth driving wheel (615) is integrated with the output shaft (3000);

the lockable or releasable mechanism (900) is installed between the shell (500) and the machine body (600);

the first, second, fifth, third, and fourth driving wheels (602), (603), (615), (616), and (617) being constituted by gears or friction wheels;

a transmission ratio of the driving wheel set with different rotary directions providing acceleration, deceleration, or constant velocity;

a transmission ratio of the driving wheel set with same rotary direction providing acceleration, deceleration, or constant velocity;

the driving wheel set with same rotary direction being constituted by an internal gear set or an internal friction wheel set;

by way of the above structure, when the input shaft (2000) is driven in the first rotary direction, the first one-way transmission (302) drives the output shaft (3000) to produce the first rotary direction output and constitute the first driving gear train;

by way of the above structure, when the lockable or releasable mechanism (900) is locked and the input shaft (2000) is driven in the second rotary direction, the output shaft (3000) is driven through the second one-way transmission (305), the first driving wheel (602), the second driving wheel (603), the third driving wheel (616), the fourth driving wheel (617), and the fifth driving wheel (615) to produce the first rotary direction output and constitute the second driving gear train; and when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

52. The lockable or releasable gear train with bidirectional input and one-way output as claimed in claim 46, wherein the input shaft and the output shaft are coaxially integrated in series, further wherein:

one end of the input shaft (2000) is installed at one side of the shell (500) via a bearing structure, the input shaft (2000) being coupled in series with the output shaft (3000) through the first one-way transmission (302), and a bearing is installed between the output shaft (3000) and the shell (500);

the input shaft (2000) being coupled with a first driving wheel (615) via the second one-way transmission (305);

the first driving wheel (615) rotating a second driving wheel (617) rotatable about or integrated with a revolving shaft (618), the second driving wheel (617) being coupled with a third driving wheel (616), the third driving wheel (616) and a fourth driving wheel (603) being integrated with a first revolving shaft (604), and a bearing being installed between the first revolving shaft (604) and the shell (500);

the second revolving shaft (618) is integrated with the shell (500), and a bearing is installed between the second revolving shaft (618) and the shell (500);

the fourth driving wheel (603) is coupled to a fifth driving wheel (602) to form a driving wheel set with different rotary directions;

the fifth driving wheel (602) is integrated with the output shaft (3000);

the lockable or releasable mechanism (900) is installed between the shell (500) and the machine body (600);

the fifth, fourth, second, third, and first driving wheels (602), (603), (615), (616), and (617) are constituted by gears or friction wheels;

a transmission ratio of the driving wheel set with different rotary directions providing acceleration, deceleration, or constant velocity;
a transmission ratio of the driving wheel set with same rotary direction providing acceleration, deceleration, or constant velocity;
the driving wheel set with same rotary direction being constituted by an internal gear set or internal friction wheel set;
by way of the above structure, when the input shaft (2000) is driven in the first rotary direction, the first one-way transmission (302) drives the output shaft (3000) to produce the first rotary direction output and constitute the first driving gear train;
by way of the above structure, when the lockable or releasable mechanism (900) is locked and the input shaft (2000) is driven in the second rotary direction, the output shaft (3000) is driven through the second one-way transmission (305), the first driving wheel (615), the second driving wheel (616), the third driving wheel (603), the fourth driving wheel (617), and the fifth driving wheel (602) to produce the first rotary direction output and constitute the second driving gear train; and
when a reverse drive caused by a backwards move occurs at the output shaft (3000), the lockable or releasable mechanism (900) is released, resulting in idling between the shell (500) and the machine body (600), preventing locking of the first driving gear train and the second driving gear train.

53. The lockable or releasable gear train with bidirectional input and one-way output as claimed in claim 1, wherein the lockable or releasable mechanism (900) is driven to be locked or released by locking or releasing human power, or locking or releasing machine power, or locking or releasing aerodynamic force, or locking or releasing fluid power, or locking or releasing electromagnetic force.

* * * * *